US 6,560,355 B2

(12) United States Patent
Graves et al.

(10) Patent No.: US 6,560,355 B2
(45) Date of Patent: May 6, 2003

(54) CURRENCY EVALUATION AND RECORDING SYSTEM

(75) Inventors: Bradford T. Graves, Arlington Heights, IL (US); William J. Jones, Kenilworth, IL (US); Douglas U. Mennie, Barrington, IL (US); Frank M. Csulits, Gurnee, IL (US)

(73) Assignee: Cummins-Allison Corp., Mount Prospect, IL (US)

( * ) Notice: Subject to any disclaimer, the term of this patent is extended or adjusted under 35 U.S.C. 154(b) by 78 days.

(21) Appl. No.: 09/777,099

(22) Filed: Feb. 5, 2001

(65) Prior Publication Data

US 2001/0006556 A1 Jul. 5, 2001

Related U.S. Application Data

(63) Continuation of application No. 08/962,080, filed on Oct. 31, 1997, now abandoned.

(51) Int. Cl.[7] .................................................. G06K 9/00
(52) U.S. Cl. ........................................ 382/135; 382/140
(58) Field of Search ................................. 382/135–140

(56) References Cited

U.S. PATENT DOCUMENTS

| 4,205,780 A |   | 6/1980 | Burns et al. .................. 235/454 |
| 4,250,806 A |   | 2/1981 | Boyson et al. .................. 101/2 |
| 4,264,808 A |   | 4/1981 | Owens et al. ................. 235/379 |
| 4,577,763 A |   | 3/1986 | Placke et al. ................. 209/534 |
| 4,653,647 A |   | 3/1987 | Hashimoto ................... 209/534 |
| 4,823,393 A |   | 4/1989 | Kawakami ................... 382/135 |
| 4,937,321 A |   | 6/1990 | Kuder ......................... 382/137 |
| 5,023,782 A |   | 6/1991 | Lutz et al. ................... 364/405 |
| 5,187,750 A |   | 2/1993 | Behera ........................... 382/7 |
| 5,191,613 A | * | 3/1993 | Graziano et al. ............. 713/176 |
| 5,193,121 A |   | 3/1993 | Elischer et al. ................. 382/7 |
| 5,237,158 A |   | 8/1993 | Kern et al. ................... 235/379 |
| 5,295,196 A |   | 3/1994 | Raterman et al. ............... 382/7 |
| 5,321,238 A |   | 6/1994 | Kamata et al. .............. 235/379 |
| 5,390,003 A |   | 2/1995 | Yamaguchi et al. ......... 355/201 |
| 5,430,644 A |   | 7/1995 | Cargill et al. ............... 382/135 |
| 5,467,405 A |   | 11/1995 | Raterman et al. ........... 382/135 |

(List continued on next page.)

FOREIGN PATENT DOCUMENTS

| GB | 2 088 832 | 6/1982 |
| WO | WO 90/07165 | 6/1990 |
| WO | WO 92 17394 | 10/1992 |

OTHER PUBLICATIONS

Glory Ltd., Glory Instruction Manual for Model GRF–100 Currency Reader Counter, Jan. 8, 1996, p. 11.

Primary Examiner—Jingge Wu
(74) Attorney, Agent, or Firm—Jenkens & Gilchrist

(57) ABSTRACT

A system for evaluating currency bills with currency evaluation machines and recording information associated with the evaluated currency bills. The currency evaluation machines utilize sensors to obtain information from the evaluated bills, and comparison tests are performed in which the sensor information is compared to master information in order to identify the denomination, series and authenticity of the currency bills being evaluated. A reviewable record of the comparison tests is maintained for each individual currency evaluation machine. After performing the comparison tests, evaluated bills are identified as either no call bills, suspect documents or genuine bills. Information associated with respective no call bills, suspect documents or genuine bills, including times of occurrence or quantities of no call bills, suspect documents or genuine bills, and/or denomination of suspect documents or genuine bills is recorded in the reviewable record. In one embodiment, the reviewable record is communicated from a network of individual currency evaluation machines to centralized controllers which maintain an aggregate record of information compiled from the individual machines.

48 Claims, 13 Drawing Sheets

U.S. PATENT DOCUMENTS

| | | | |
|---|---|---|---|
| 5,530,772 A | 6/1996 | Storey | 382/135 |
| 5,544,043 A | 8/1996 | Miki et al. | 364/406 |
| 5,607,040 A | 3/1997 | Mathurin, Sr. | 194/207 |
| 5,659,628 A | 8/1997 | Tachikawa et al. | 382/135 |
| 5,790,697 A | 8/1998 | Munro et al. | 382/135 |
| 5,963,659 A * | 10/1999 | Cahill et al. | 382/139 |
| 6,021,883 A | 2/2000 | Casanova et al. | 194/217 |
| 6,125,196 A * | 9/2000 | Carey et al. | 382/138 |
| 6,363,164 B1 * | 3/2002 | Jones et al. | 382/135 |

* cited by examiner

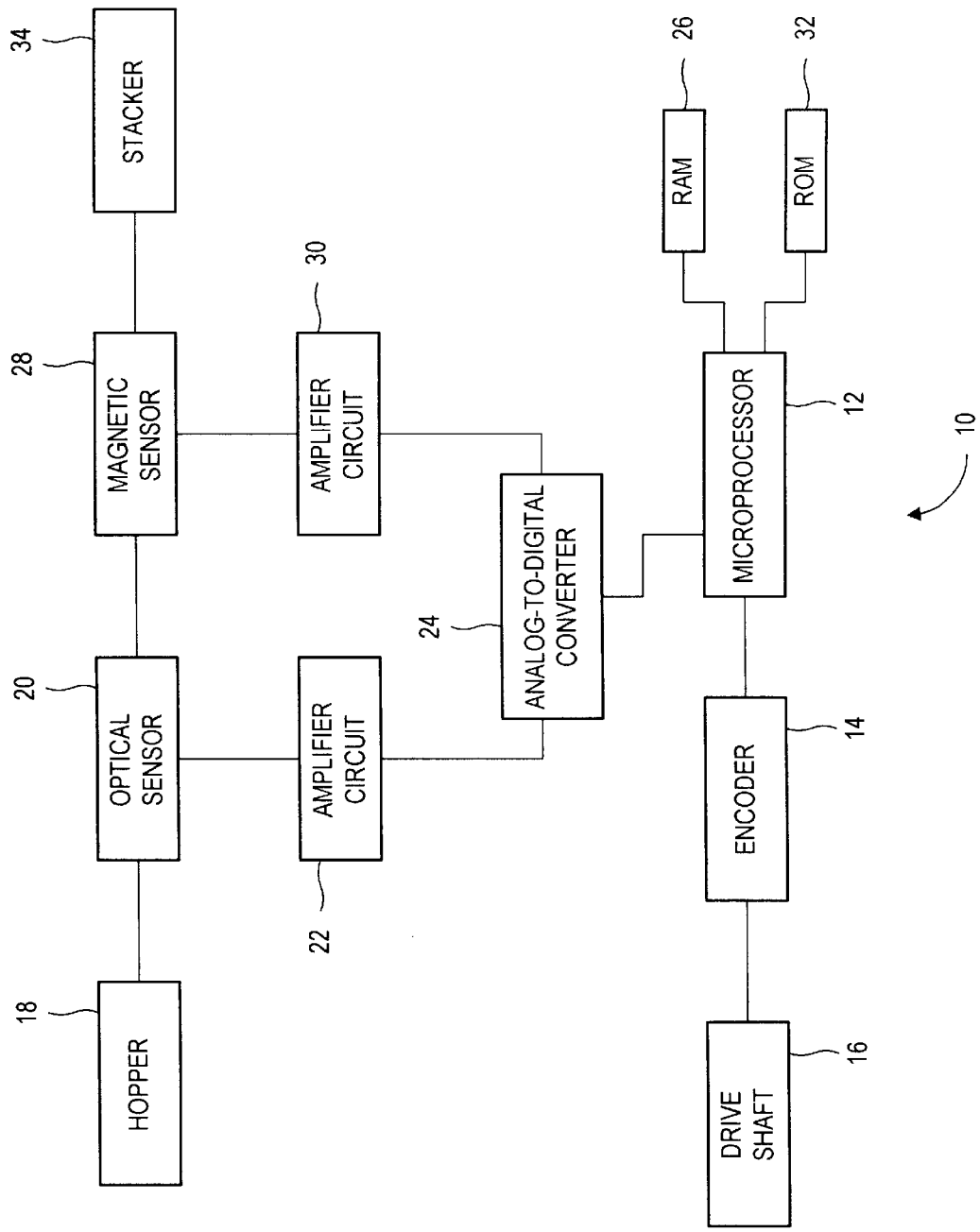

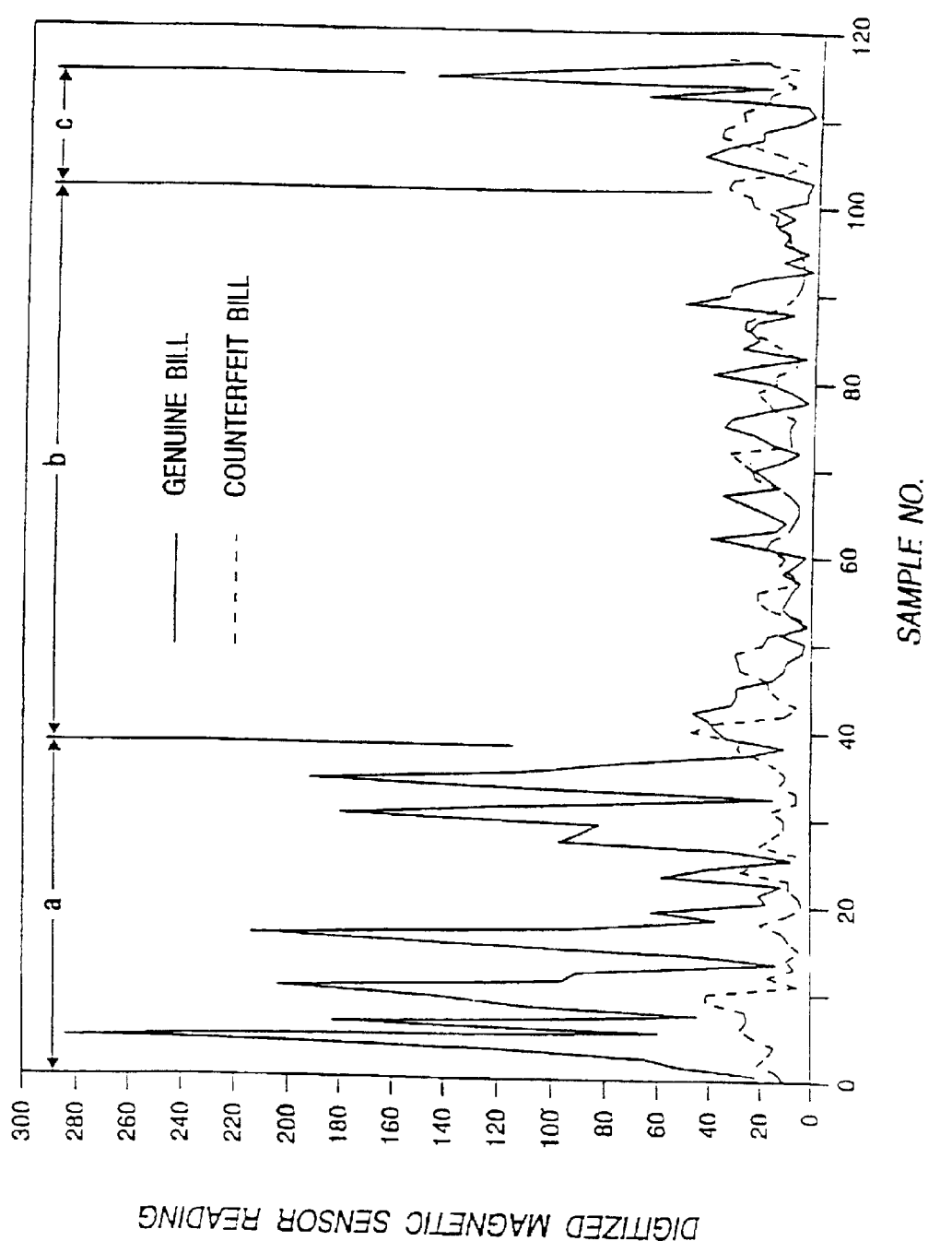

CURRENCY EVALUATION AND RECORDING SYSTEM

CROSS-REFERENCE TO RELATED APPLICATION

This application is a continuation of pending U.S. patent application Ser. No. 08/962,080, filed Oct. 31, 1997.

BACKGROUND OF THE INVENTION

1. Field of the Invention

The present invention relates, in general, to document authentication and discrimination. More specifically, the present invention relates to a system for evaluating currency bills and maintaining a record of authentic, counterfeit and/or unidentified bills evaluated by the system.

2. Background

A number of systems have been developed for authenticating the genuineness of currency notes and other security documents. Included among such systems are automated machines having the capability to accommodate a stack of currency bills and/or documents and rapidly evaluate all the bills in the stack. Generally, such machines are equipped with one or more sensors to evaluate one or more characteristics of the documents under test including, for example, magnetic, optical, UV or visible light reflectance or transmissivity characteristics.

Among the more sophisticated of such currency evaluation machines are those which are capable of identifying, discriminating and counting multiple currency denominations. This type of machine, hereinafter designated as a "currency discriminator," typically employs optical or magnetic sensors to identify the respective bills in the stack by discriminating between different denominations of currency bills. Currency discrimination is based on the comparison of sensed optical or magnetic characteristics with prestored parameters relating to different denominations of bills, while accounting for adequate tolerances reflecting differences among bills of a given denomination and/or series. Magnetic sensing is based on detecting the presence or absence of magnetic ink in portions of the printed indicia on the currency by using magnetic sensors, usually ferrite core-based sensors, and using the detected magnetic signals, after undergoing analog or digital processing, as the basis for discrimination. The more commonly used optical sensing technique, on the other hand, is based on detecting and analyzing variations in light reflectance or transmissivity characteristics occurring when a currency bill is illuminated and scanned by a strip of focused light.

In addition to determining the denomination of a bill, a currency discriminator may detect suspect or counterfeit bills by sensing characteristic information such as, for example, magnetic, optical, UV or visible light reflectance or transmissivity characteristics, then comparing the sensed information to the expected characteristics of a bill of the same denomination. A document is considered genuine or counterfeit depending on whether the detected data is within an acceptable range of an expected value.

Less sophisticated types of currency evaluation machines, known as "counters," are not designed to identify or discriminate among multiple currency denominations of bills but rather are designed to rapidly count the number of currency bills in a stack. Because counters are incapable of determining the denomination of bills, they are generally used to evaluate stacks of bills which have already been pre-sorted by denomination such as, for example, a stack consisting entirely of $5 bills or consisting entirely of $100 bills. In some models, the counter may be externally informed of the denomination of bills which it is counting by an operator, so that displays, sensitivity levels, etc. may be adjusted according to the appropriate denomination. For example, counters having been informed of the denomination of bills may include sensors for detecting suspect or counterfeit bills in substantially the same manner as that of currency discriminators, including variation of authentication methods or adjustment of sensitivity levels corresponding to the denomination of the bills to be authenticated.

Whether suspect documents are detected by a currency discriminator or counter, it is desirable to separate the detected suspect documents from genuine documents. This may be accomplished automatically by the currency discriminator or counter, for example, by stopping the machine to permit the operator to remove the suspect documents from the machine immediately after they are detected or by delivering suspect documents to an output receptacle separate from that of genuine documents. Both of these methods are described in co-pending patent application Ser. No. Unknown, Attorney Docket No.:CUMM 190, assigned to the assignee of the present invention and incorporated herein by reference in its entirety.

After removing suspect documents from the currency discriminator or counter, an operator typically places the suspect documents in a separate retaining area for collection and subsequent forwarding to the proper authorities. Generally, it would be desirable if records could be maintained of the suspect documents which have been detected by a particular machine throughout a designated time period. For example, it would be desirable to record how many suspect $100 notes, $50 notes, etc. are received each day. This would enable the operator to monitor the source of suspect documents and, if possible, reduce or eliminate the occurrences of such suspect documents. Recordation of suspect documents may also facilitate subsequent adjustment of sensitivity levels, for example, to increase or reduce the number of suspect notes detected for a particular denomination of currency to a desired amount. Heretofore, however, after detection of suspect documents by a currency discriminator or counter, recordation of the suspect documents has been accomplished, if at all, by the operator in a manual and time-consuming secondary operation. Accordingly, there is a need for a more automated, efficient system of recording suspect documents detected by currency discriminators or counters. The present invention is directed to satisfying these needs.

SUMMARY OF THE INVENTION

In accordance with one aspect of the present invention, there is provided a currency discriminator for evaluating currency bills and recording information associated with the evaluated bills. The currency bills to be evaluated are generally unidentified and unauthenticated. The currency bills to be evaluated are transported, one at a time, from an input receptacle to an output receptacle along a transport path. First and second scanheads positioned along the transport path obtain respective first and second types of detected characteristic information from the currency bills being evaluated. A system memory stores first and second types of master characteristic information corresponding to genuine currency bills of assorted denominations and/or series. A microprocessor performs respective first and second comparison tests to identify and determine the authenticity of the currency bills being evaluated, and recording means is provided for maintaining a reviewable record of the first and second comparison tests.

In the first comparison test, for each individual bill under test, the microprocessor evaluates whether the first tape of detected characteristic information obtained from the bill under test sufficiently matches an item of the first type of master characteristic information corresponding to a particular denomination and/or series of bill. If a positive determination is reached in the first comparison test, the microprocessor identifies the denomination and/or series of the bill under test. If a negative determination is reached in the first comparison test, the microprocessor generates a no call error signal indicating that it is unable to identify the denomination and/or series of the bill under test. The transport mechanism may be halted upon each occurrence of a no call error signal to permit removal of the no call bill or document. Information associated with the no call error signal(s) including, for example, times of occurrence or quantities of no call error signal(s) is recorded in system memory for subsequent review.

In the second comparison test, for each individual bill having its denomination and/or series identified by the first comparison test, the microprocessor evaluates whether the second type of detected characteristic information obtained from the bill under test sufficiently matches the second type of master characteristic information corresponding to the denomination and/or series of the bill under test. If a positive determination is reached in the second comparison test, the bill is authenticated as genuine. If a negative determination is reached in the second comparison test, the microprocessor generates a suspect document error signal indicating that the bill under test is suspected to be non-genuine. The transport mechanism may be halted upon each occurrence of a suspect document error signal to permit removal of the suspect bill or document. Information associated with the authenticated or suspect bill(s) including, for example, times of occurrence or quantities of suspect document error signals, as well as the denomination and/or series of the authenticated or suspect bill(s) is recorded in system memory for subsequent review.

In accordance with another aspect of the present invention, there is provided a currency counter for evaluating currency bills and recording information associated with the evaluated bills. The currency bills to be evaluated are generally unauthenticated but have a pre-specified or pre-indicated denomination and/or series. The currency bills to be evaluated are transported, one at a time, from an input receptacle to an output receptacle along a transport path. A scanhead positioned along the transport path obtains detected characteristic information from the currency bills being evaluated. A system memory stores master characteristic information corresponding to genuine currency bills of assorted denominations and/or series. A microprocessor performs respective comparison tests to determine the authenticity of the currency bills being evaluated, and recording means is provided for maintaining a reviewable record of the results of the comparison tests.

In the comparison tests, for each individual bill having a pre-specified denomination and/or series, the microprocessor evaluates whether the detected characteristic information obtained from the bill under test sufficiently matches the master characteristic information corresponding to the denomination and/or series of the bill under test. If a positive determination is reached in the comparison test, the bill is authenticated as genuine. If a negative determination is reached in the comparison test, the microprocessor generates a suspect document error signal indicating that the bill under test is suspected to be non-genuine. The transport mechanism may be halted upon each occurrence of a suspect document error signal to permit removal of the suspect bill or document. Information associated with the authenticated or suspect bill(s) including, for example, times of occurrence or quantities of suspect document error signals, as well as the denomination and/or series of the authenticated or suspect bill(s) is recorded in system memory for subsequent review.

BRIEF DESCRIPTION OF THE DRAWINGS

Other objects and advantages of the invention will become apparent upon reading the following detailed description in conjunction with the drawings in which:

FIG. 1a is a block diagram of a currency evaluation and recording system according to one embodiment of the present invention;

FIG. 3 is a graphical representation of magnetic data points generated by both a genuine one hundred dollar bill and a counterfeit one hundred dollar bill;

DETAILED DESCRIPTION OF THE PREFERRED EMBODIMENTS

Figure 1B:
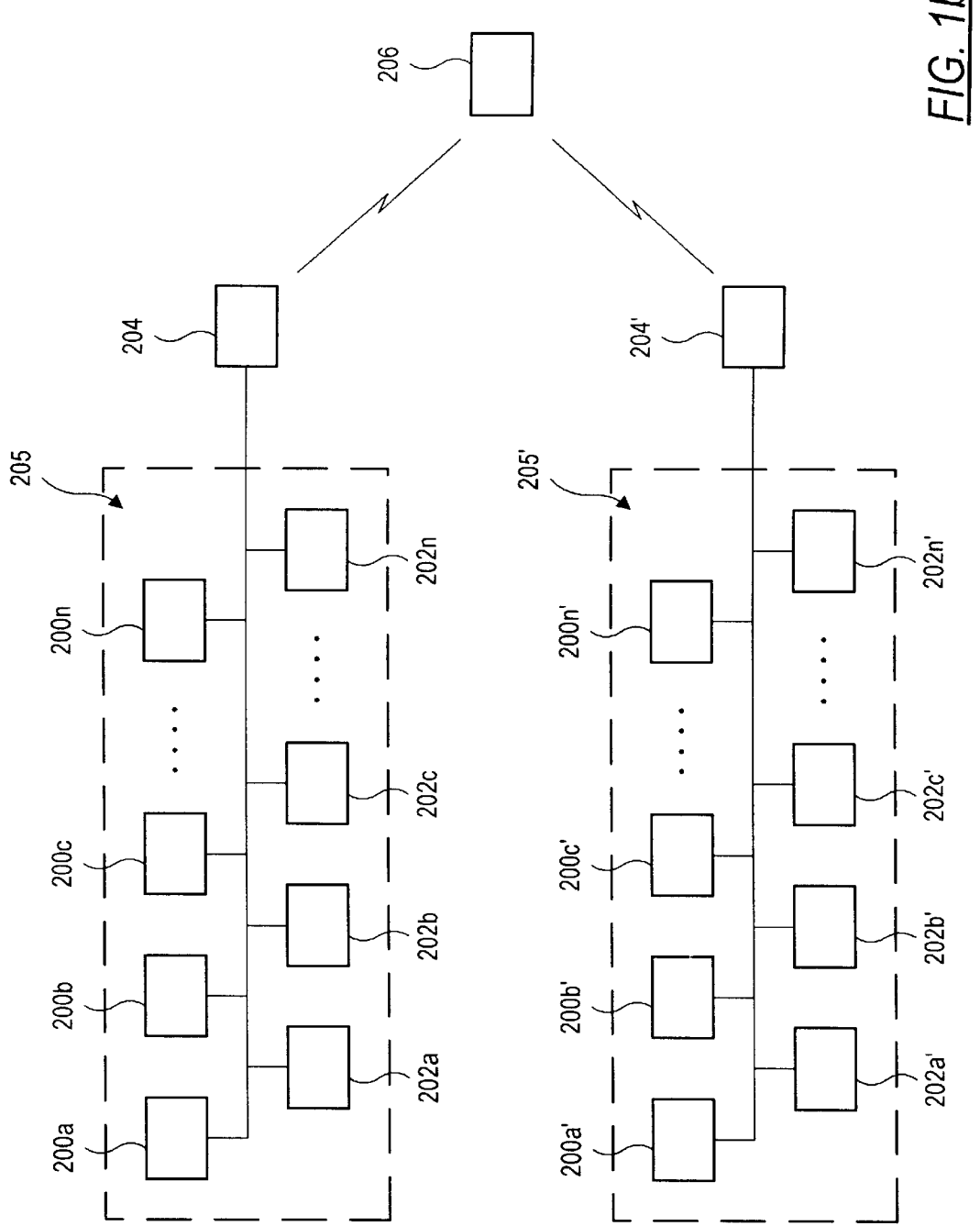
FIG. 1b is a block diagram illustrating a currency evaluation and recording network which may be utilized according to principles of the present invention.

Referring to the drawings, FIG. 1a shows a block diagram of a currency evaluation and recording system 10 according to one embodiment of the present invention. A microprocessor 12 controls the overall operation of the currency evaluation and recording system 10. An encoder 14 may be used to provide input to the microprocessor 12 based on the position of a drive shaft 16, which operates a transport mechanism (not shown) conveying documents through the currency evaluation and recording system 10. It should be noted that the detailed construction of the transport mechanism is not related to the practice of the present invention. Many configurations are well-known in the prior art. An exemplary configuration includes an arrangement of pulleys and rubber belts driven by a single motor. The input from the encoder 14 allows the microprocessor to calculate the position of documents conveyed through the device 10 and coordinate the timing of various operations of the currency evaluation and recording system 10.

An input receptacle or "hopper" 18 is provided for receiving a stack of documents including currency bills (not shown) to be evaluated by the system 10. Typically, the system 10 is designed to accommodate currency bills originated by a particular country such as, for example, United States currency bills. Accordingly, the hopper 18 is generally adapted to accommodate genuine or counterfeit currency bills from the designated country. Generally, the system 10 will also accommodate other documents dimensioned to fit within the hopper 18 such as, for example, foreign currency bills, other security documents or sheets of paper dimensioned to fit within the hopper 18. The hopper 18 holds the documents securely and allows the documents in the stack to be conveyed one at a time through the currency evaluation and recording system 10.

In the embodiment portrayed in FIG. 1a, documents are conveyed to the interior of the currency evaluation and recording system 10 and scanned by respective optical and magnetic sensors 20, 28. Then, after passing by the respective optical and magnetic sensors 20, 28, the bills exit the system 10 and are delivered to a stacker 34. The stacker 34 generally includes one or more output receptacles or trays sized to accept the appropriate documents. A currency evaluation system including more than one output receptacle is shown, for example, in U.S. patent application Ser. No. Unknown, Attorney Docket No.:CUMM 190, assigned to the assignee of the present invention and incorporated herein by reference. As will be described in detail hereinafter, the optical sensor 20 is a discrimination sensor which determines the denomination, series, etc. of currency bills and the magnetic sensor 28 is an authentication sensor which distinguishes counterfeit bills from genuine bills. Thus, the system 10 shown in FIG. 1a comprises a currency discriminator of the type heretofore described. Nevertheless, it will be appreciated that counterfeit document detection and recording systems embodying principles of the present invention may be employed in counters as well as currency discriminators. Because the denomination of currency bills has generally been predetermined in a counter, the discrimination sensor 20 may be eliminated in a counter. It will further be appreciated that alternative types of sensors (e.g., other than optical and magnetic) may be used for discrimination and/or authentication of currency bills.

In the illustrated embodiment, the optical discrimination sensor 20 generates signals that correspond to the amount of light reflected by a small portion of the bill. Signals from the optical sensor 20 are sent to an amplifier circuit 22, which, in turn, sends an output to an analog-to-digital convertor 24. The output of the ADC is read by the microprocessor 12. The microprocessor 12 stores each element of data from the optical sensor 20 in a range of memory locations in a random access memory ("RAM") 26, forming a set of image data that corresponds to the object scanned.

As the bill continues its travel through the currency evaluation and recording system 10, it passes a magnetic authentication sensor 28, which detects the presence of magnetic ink on the bill. The magnetic sensor 28 desirably makes a plurality of measurements along a path parallel to one edge of the bill being examined. For example, the path sensed by the magnetic sensor 28 may be parallel to the shorter edges of the bill and substantially through the bill's center. The output signal from the magnetic sensor 28 is amplified by an amplifier circuit 30 and digitized by the ADC 24. The digital value of each data point measured by the magnetic sensor 28 is read by the microprocessor 12, whereupon it is stored in a range of memory in the RAM 26.

The digitized magnetic data may be mathematically manipulated to simplify its use. For example, the value of all data points may be summed to yield a checksum, which may be used for subsequent comparison to expected values computed from samples of genuine bills. As will be apparent, calculation of a checksum for later comparison eliminates the need to account for the orientation of the bill with respect to the magnetic sensor 28. This is true because the checksum represents the concentration of magnetic ink across the entire path scanned by the magnetic sensor 28, regardless of variations caused by higher concentrations in certain regions of the bill.

The image data stored in the RAM 26 is compared by the microprocessor 12 to standard image data stored in a read only memory ("ROM") 32. The stored image data corresponds to optical data generated from genuine currency of a plurality of denominations and/or series. The ROM image data may represent various orientations of genuine currency to account for the possibility of a bill in the stack being in a reversed orientation compared to other bills in the stack. If the image data generated by the document or bill being evaluated does not fall within an acceptable limit of any of the images stored in ROM, the document is determined to be a "no call" bill, e.g., having an unknown denomination and/or series. Thereafter, in one embodiment of the present invention, the machine is stopped to allow removal of the no call bill from the stack. Alternatively, in machines having more than one output receptacle, the no call bill may be delivered to a separate output receptacle apart from the of other bills in the stack to facilitate removal of the no call bill. In this embodiment, upon delivery of the no call bill to the separate output receptacle, the machine may be programmed in advance to stop or continue to process remaining bills in the stack.

If the image data from the bill being evaluated corresponds to one of the images stored in the ROM 32, the microprocessor 12 compares the checksum of the magnetic data to one of a plurality of expected checksum values stored in the ROM 32. An expected checksum value is stored for each denomination and/or series that is being counted. The value of each expected checksum is determined, for example, by averaging the magnetic data from a number of genuine samples of each denomination of interest. If the value of the measured checksum is within a predetermined range of the expected checksum, the bill is considered to be genuine. If the checksum is not within the acceptable range, the operator is signaled that the document is suspect and the operation of the system 10 is stopped to permit removal of the suspect document from the machine. Alternatively, in machines having more than one output receptacle, the suspect document may be delivered to a separate output receptacle apart from the of other documents in the stack to facilitate removal of the suspect document. In this embodiment, upon delivery of the suspect document to the separate output receptacle, the machine may be programmed in advance to stop or continue to process remaining documents in the stack.

It should be noted that the magnetic checksum is only compared to the expected checksum for a single denomination and/or series of bill (i.e. the denomination and/or series that the optical data comparison has indicated). Thus, the only way in which a bill can be classified as genuine is if its magnetic checksum is within an acceptable range for its specific denomination and/or series. For a counterfeit bill to be considered genuine by the counterfeit document detection and recording system of the present invention, it would have to be within an acceptable range in the denomination-discriminating optical comparison and have a distribution of magnetic ink within an acceptable range for its specific denomination and/or series.

To summarize the operation of the system of FIG. 1a, a stack of bills is fed into the hopper 18. Each bill is transported adjacent to an optical sensor 20, which generates image data corresponding to one side of the bill. The denomination and/or series of the bills is determined by comparing the image data generated by the optical sensor 20 to stored images corresponding to a plurality of denominations and/or series of currency. The microprocessor 12 generates an error signal indicating that the bill is a no call bill if the image data does not sufficiently correspond to the stored images. The bills are also scanned by a magnetic sensor 28 which generates a plurality of data points corresponding to the presence of magnetic ink. The magnetic data points are recorded by the microprocessor 12, which generates a checksum by adding the total of all magnetic data points. Where the denomination and/or series of the bill being evaluated has been determined by the optical sensing operation (or in a counter, where the denomination and/or series of the bill being evaluated has been predetermined), the checksum is compared to a stored checksum corresponding to a genuine bill of that denomination and/or series. The microprocessor 12 generates a signal indicating that the bill is genuine or counterfeit depending on whether said data is within a predetermined range of the expected value. Microprocessor signals indicating the occurrence of no call bills, suspect bills and genuine bills are recorded and stored in system memory for subsequent recall and review. Bills exit the counterfeit document detection and recording system 10 and are accumulated in the stacker 34.

After identifying no call documents and/or suspect documents, the system 10 according to the present invention is designed to record identifying characteristics associated with the respective no call or suspect documents. In the case of no call documents, for example, the microprocessor 12 automatically generates a signal upon the occurrence of the no call document. The signal may comprise a voltage level, numerical value or any suitable response to the occurrence of the no call document. The signal is recorded in system memory (e.g., RAM 26) for subsequent recall, review and/or printout by an operator, thereby providing a reviewable record indicating the presence of a no call document in the stack. Advantageously, the record may include further identifying characteristics associated with the respective no call documents such as, for example, the machine which detected the no call documents, the operator, the time of day, etc. The record may further include a running total (e.g., cumulative number) of no call bills detected throughout a designated time interval or throughout a designated number of stacks.

Advantageously, the record will include similar information indicating the occurrence of suspect documents, e.g., in a currency discriminator, those documents having a denomination and/or series determined by the discriminating sensor and not authenticated by the authenticating sensor, or in a counter, those documents having a pre-specified denomination and/or series and not authenticated by the currency discriminator. In the case of suspect documents, the record may include the denomination and/or series of the suspect documents in addition to any of the several types of information discussed above in relation to undetermined denomination documents. The system 10 may further include the capability to maintain a running total of genuine currency of each denomination and/or series.

In the embodiment shown in FIG. 1b, a plurality of currency discriminators $200a \ldots 200n$ and/or counters $202a \ldots 202n$, each maintaining an individual record of no call documents, suspect documents and genuine currency, are linked together in a local area network 205 monitored by a local system controller 204. The local system controller 204 may comprise, for example, a personal computer (such as a 486 or equivalent) in communication with the currency discriminators $200a \ldots 200n$ and/or counters $202a \ldots 202n$ in the network 205. Additionally, a central controller 206 or controllers may be provided for linking together and communicating with a plurality of local system controllers 204, $204' \ldots 204^{(n)}$, each being associated with their own respective local network 205, $205' \ldots 205^{(n)}$. Such a system may be implemented, for example, by a banking operation having a central office and several branch banks, each of which may be geographically remote from each other, by providing each branch bank with a network 205 monitored by a local system controller 204 and providing the central office with a central controller 206.

Each of the local system controllers 204 communicates with the individual currency discriminators $200a \ldots 200n$ and/or counters $202a \ldots 202n$ in its designated area (e.g., in a branch bank) to obtain information associated with no call documents, suspect documents and genuine currency evaluated by the individual currency discriminators and/or counters in the designated area. According to one embodiment of the present invention, the local system controller 204 processes the information compiled from the individual machines to derive an aggregate record of no call documents, suspect documents and genuine currency evaluated in the designated area (e.g., in a branch bank). Similarly, the central controller 206 communicates with the local system controllers 204 to obtain information regarding no call documents, suspect documents and genuine currency evaluated by the individual machines and/or to obtain aggregate data produced by the local system controllers 204. The central controller 206 processes the information compiled from the various local system controllers 204 to produce a still further aggregate record of no call documents, suspect documents and genuine currency evaluated in the entire network (e.g., in a network of several branch banks). It will be appreciated that each of the local system controllers 204 and central controllers 206 may be equipped with with their own system memory, display and/or printer so that data received or derived by any local system controller or central controller may be exchanged, reviewed and/or printed out at any selected location in the network.

By reviewing the recorded instances of no call documents and suspect documents, a manager/operator may determine the number of respective no call documents and suspect documents received within a designated time interval by an individual machine, by a particular branch location, or by the entire network. The manager/operator may thereafter take corrective action to reduce or eliminate the occurrences of such documents, or reduce the likelihood that such documents will go undetected. For example, suppose that by reviewing such a record, a central manager is informed that a disproportionate number of counterfeit newer-series $100 bills were received by a particular branch bank, or by several branch banks within a particular geographic region (e.g., city or state) within a designated time interval. Based upon this information, the central manager may instruct the appropriate bank or banks to more closely monitor newer-series $100 bills, thereby reducing the likelihood that the bank(s) will fail to detect such counterfeit $100 bills. The manager may further instruct the appropriate bank or banks to change the sensor sensitivity levels in one or more currency discrimination machines or counters to either increase or reduce the number of detected suspect $100 notes in a particular machine, bank or series of banks.

Figure 2A:
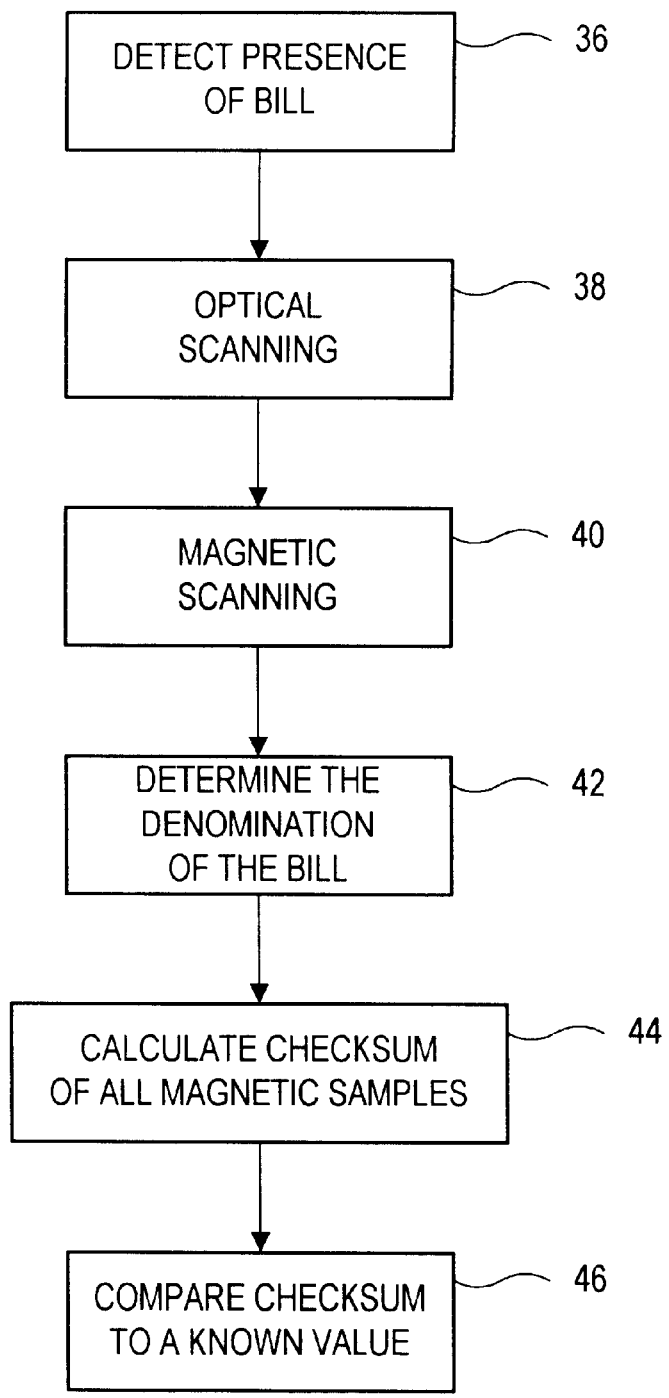
FIG. 2a is a flow diagram illustrating the operation of the currency evaluation and recording system of FIG. 1 when employed with a currency discriminator.

FIG. 2a is a flow diagram illustrating the operation of the currency evaluation and recording system of FIG. 1a, when employed in a currency discriminator. At step 36, the presence of a bill approaching the optical sensor 20 is detected by the microprocessor 12, which initiates an optical scanning operation 38. Image data generated by the optical scanning operation are stored in RAM 26. The number of optical samples taken is not critical to the operation of the present invention, but the probability of accurate classification of the denomination of a bill increases as the number of samples increases.

At step 40, the microprocessor 12 initiates the magnetic scanning operation. The data points obtained by the magnetic scanning operation may be stored in the RAM 26 and added together later to yield a checksum, as shown in step 44. Alternatively, the checksum may be calculated by keeping a running total of the magnetic data values by adding each newly acquired value to the previous total. As with the optical scanning operation, the number of data points measured is not essential, but the chances of accurately identifying a counterfeit bill based on the concentration of magnetic ink improve as the number of samples increases. At step 42, the microprocessor determines the denomination and/or series of the bill by comparing the image data to a plurality of known images, each of which corresponds to a specific denomination and/or series of currency. The bill is identified as belonging to the denomination and/or series corresponding to one of the known scan patterns if the correlation between the two is within an acceptable range. At step 46, the checksum resulting from the summation of the magnetic data points is compared to an expected value for a genuine bill of the denomination and/or series identified by the comparison of the image data to the stored data.

Figure 2B:
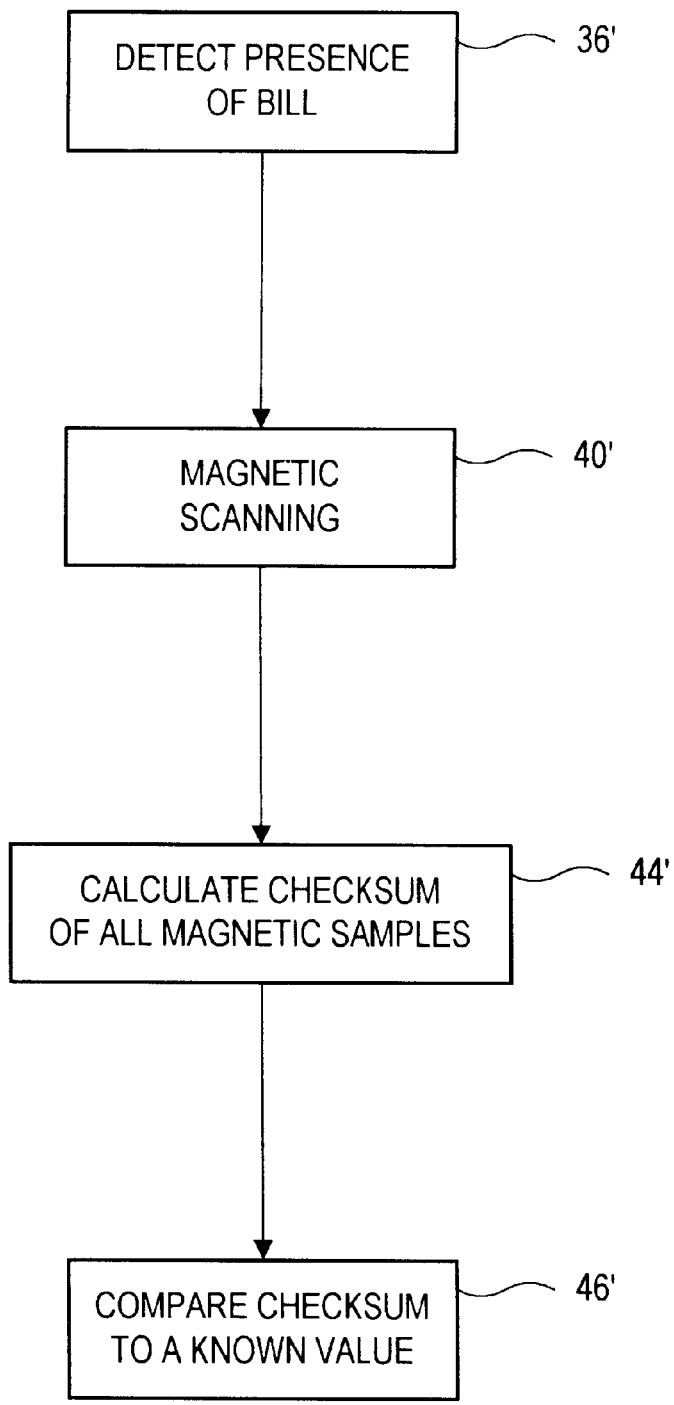
FIG. 2b is a flow diagram illustrating the operation of the currency evaluation and recording system of FIG. 1 when employed with a counter.

FIG. 2b is a flow diagram illustrating the operation of the currency evaluation and recording system of FIG. 1, when employed in a counter. At step 36', the presence of a bill having a pre-specified denomination and/or series is detected by the microprocessor 12. At step 40', the microprocessor 12 initiates the magnetic scanning operation. The data points obtained by the magnetic scanning operation may be stored in the RAM 26 and added together later to yield a checksum, as shown in step 44'. Alternatively, the checksum may be calculated by keeping a running total of the magnetic data values by adding each newly acquired value to the previous total. At step 46', the checksum resulting from the summation of the magnetic data points is compared to an expected value for a genuine bill of the pre-specified denomination and/or series.

In either a discriminator or counter, the expected value may be determined in a variety of ways. One method is to empirically measure the concentration of magnetic ink on a sample of genuine bills and average the measured concentrations. Another method is to program the microprocessor to periodically update the expected value based on magnetic data measurements of bills evaluated by the currency evaluation and recording system over a period of time.

If the checksum of the bill being evaluated is within a predetermined range of the expected value, the bill is considered to be genuine. Otherwise, the bill is considered to be counterfeit. As will be apparent, the choice of an acceptable variation from the expected checksum determines the sensitivity of the counterfeit document detection and recording system. If the range chosen is too narrow, the possibility that a genuine bill will be classified as counterfeit is increased. On the other hand, the possibility that a counterfeit bill will be classified as genuine increases if the acceptable range is too broad.

FIG. 3 is a graphical representation of the magnetic data points generated by both a genuine one hundred dollar bill (solid line) and a counterfeit one hundred dollar bill (broken line). As previously noted, bills are desirably scanned along a path that is parallel to one of their short edges. The graph shown In FIG. 3 shows magnetic data obtained by scanning a path passing approximately through the center of the bill. The measurements in the region designated "a" correspond to the area at the top of the bill. The area designated "b" corresponds to the central region of the bill and the region designated "c" corresponds to the bottom of the bill. The magnetic measurements for the genuine bill are relatively high in region a because of the high concentration of magnetic ink near the top of the bill. The concentration of magnetic ink in region b is relatively small and the concentration in region c is generally between the concentrations in regions a and c.

It should be noted that the concentration of magnetic ink in a typical counterfeit bill is uniformly low. Thus, the sum of all the data points for a counterfeit bill is generally significantly lower than for a genuine bill. Nonetheless, as counterfeiting techniques become more sophisticated, the correlation between genuine bills and counterfeits has improved.

The system described above increases the chances of identifying a counterfeit bill because, whether employed in a currency discriminator or counter, the denomination and/or series of a bill being evaluated is determined prior to the evaluation of the bill for genuineness. The checksum of the bill being evaluated is only compared to the expected checksum for a bill of the known denomination and/or series. The process of identifying the denomination and/or series of the bill prior to evaluating it for genuineness minimizes the chance that a "good" counterfeit will generate a checksum indicative of a genuine bill.

Figure 4:
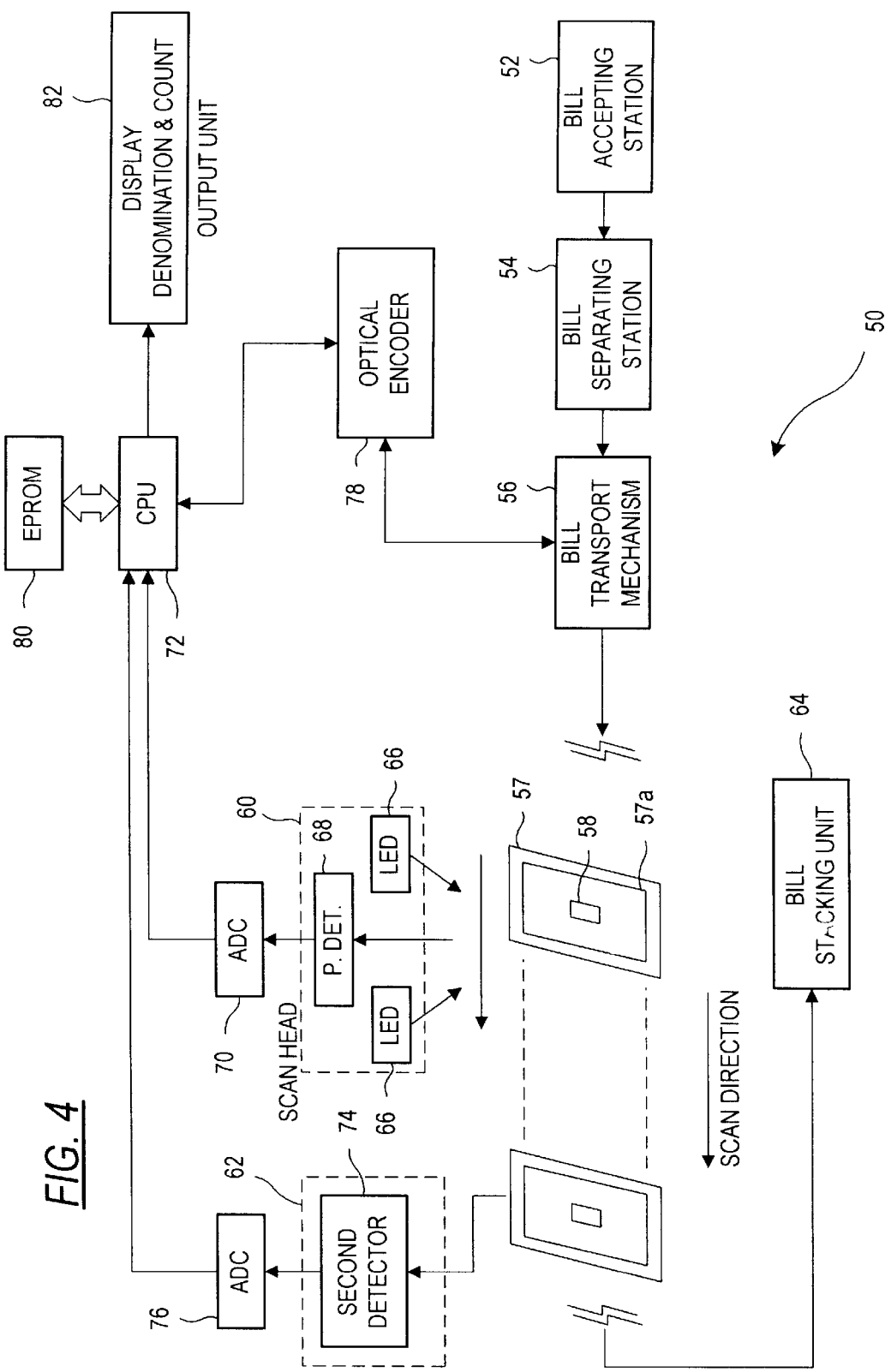
FIG. 4 is a functional block diagram of a currency evaluation and recording system according to another embodiment of the present invention.

Referring next to FIG. 4, there is shown a functional block diagram illustrating a currency evaluation and recording system 50 according to another embodiment of the present invention. The system 50 includes a bill accepting station 52 where stacks of currency bills that need to be identified, authenticated, and counted are positioned. Accepted bills are acted upon by a bill separating station 54 which functions to pick out or separate one bill at a time for being sequentially relayed by a bill transport mechanism 56, according to a precisely predetermined transport path, across two scanheads 60 and 62. The first scanhead 60 is adapted to identify the denomination and/or series of the respective bills, whereas the second scanhead 62 is provided for authenticating the respective bills. The system 50 shown in FIG. 4, including both discrimination and authentication scanheads 60, 62 is adapted for use in a currency discriminator as heretofore described. Nevertheless, it will be appreciated that the system 50 shown in FIG. 4 may be employed in a counter using only scanhead 62, i.e., by eliminating scanhead 60. It will further be appreciated that the system 50 of FIG. 4, whether embodying a currency discriminator or counter, may be employed in a currency evaluation and recording network of the type shown in FIG. 1b.

In the illustrated embodiment, the first scanhead 60 is an optical scanhead which scans for a first type of characteristic information from a scanned bill 57. The second scanhead 62 scans for a second type of characteristic information from the scanned bill 57. While in the illustrated preferred embodiment scanheads 60 and 62 are separate and distinct, it is understood that these may be incorporated into a single scanhead. For example, where the first characteristic sensed is intensity of reflected light and the second characteristic sensed is color, a single optical scanhead having a plurality of detectors, one or more without filters and one or more with colored filters, may be employed (U.S. Pat. No. 4,992,860 incorporated herein by reference). The scanned bill is then transported to a bill stacking station 64 where bills so processed are stacked for subsequent removal.

The optical scanhead 60 in the embodiment depicted in FIG. 4 comprises at least one light source 66 directing a beam of coherent light downwardly onto the bill transport path so as to illuminate a substantially rectangular light strip 58 upon a currency bill 57 positioned on the transport path below the scanhead 60. Light reflected off the illuminated strip 58 is sensed by a photodetector 68 positioned directly above the strip. The analog output of the photodetector 68 is converted into a digital signal by means of an analog-to-digital (ADC) convertor unit 70 whose output is fed as a digital input to a central processing unit (CPU) 72.

The second scanhead 62 comprises at least one detector 74 for sensing a second type of characteristic information from a bill. The analog output of the detector 74 is converted into a digital signal by means of a second analog to digital converter 76 whose output is also fed as a digital input to the central processing unit (CPU) 72.

While the scanhead 60 depicted in FIG. 4 is an optical scanhead, it should be understood that the first and second scanheads 60 and 62 may be designed to detect a variety of characteristic information from currency bills. Additionally these scanheads may employ a variety of detection means such as magnetic or optical sensors. For example, a variety of currency characteristics can be measured using magnetic sensing. These include detection of patterns of changes in magnetic flux (U.S. Pat. No. 3,280,974), patterns of vertical grid lines in the portrait area of bills (U.S. Pat. No. 3,870,629), the presence of a security thread (U.S. Pat. No. 5,151,607), total amount of magnetizable material of a bill (U.S. Pat. No. 4,617,458), patterns from sensing the strength of magnetic fields along a bill (U.S. Pat. No. 4,593,184), and other patterns and counts from scanning different portions of the bill such as the area in which the denomination is written out (U.S. Pat. No. 4,356,473).

With regard to optical sensing, a variety of currency characteristics can be measured such as detection of density (U.S. Pat. No. 4,381,447), color (U.S. Pat. Nos. 4,490,846; 3,496,370; 3,480,785), length and thickness (U.S. Pat. No. 4,255,651), the presence of a security thread (U.S. Pat. No. 5,151,607) and holes (U.S. Pat. No. 4,381,447), and other patterns of reflectance and transmission (U.S. Pat. Nos. 3,496,370; 3,679,314; 3,870,629; 4,179,685). Color detection techniques may employ color filters, colored lamps, and/or dichroic beamsplitters (U.S. Pat. Nos. 4,841,358; 4,658,289; 4,716,456; 4,825,246, 4,992,860 and EP 325, 364). An optical sensing system using ultraviolet light is described in the assignee's copending U.S. patent application Ser. No. 08/317,349, filed Oct. 4, 1994, and incorporated herein by reference, and described below.

In addition to magnetic and optical sensing, other techniques of detecting characteristic information of currency include electrical conductivity sensing, capacitive sensing (U.S. Pat. No. 5,122,754 [watermark, security thread]; U.S. Pat. No. 3,764,899 [thickness]; U.S. Pat. No. 3,815,021 [dielectric properties]; U.S. Pat. No. 5,151,607 [security thread]), and mechanical sensing (U.S. Pat. No. 4,381,447 [limpness]; U.S. Pat. No. 4,255,651 [thickness]).

In the currency evaluation and recording system 50 of FIG. 4, the bill transport path is defined in such a way that the transport mechanism 56 moves currency bills with the narrow dimension of the bills parallel to the transport path and the scan direction. Alternatively, the system 50 may be designed to scan bills along their long dimension or along a skewed dimension. As a bill 57 moves on the transport path on the scanhead 60, the coherent light strip 58 effectively scans the bill across the narrow dimension of the bill. In the preferred embodiment depicted, the transport path is so arranged that a currency bill 57 is scanned by scanhead 60 approximately about the central section of the bill along its narrow dimension, as shown in FIG. 4. The scanhead 60 functions to detect light reflected from the bill as it moves across the illuminated light strip 58 and to provide an analog representation of the variation in light so reflected which, in turn, represents the variation in the dark and light content of the printed pattern or indicia on the surface of the bill. This variation in light reflected from the narrow dimension scanning of the bills serves as a measure for distinguishing, with a high degree of confidence, among a plurality of currency denominations and/or series which the system of this invention is programmed to handle.

A series of such detected reflectance signals are obtained across the narrow dimension of the bill, or across a selected segment thereof, and the resulting analog signals are digitized under control of the CPU 72 to yield a fixed number of digital reflectance data samples. The data samples are then subjected to a digitizing process which includes a normalizing routine for processing the sampled data for improved correlation and for smoothing out variations due to "contrast" fluctuations in the printed pattern existing on the bill surface. The normalized reflectance data so digitized represents a characteristic pattern that is fairly unique for a given bill denomination and/or series and provides sufficient distinguishing features between characteristic patterns for different currency denominations and/or series. This process is more fully explained in U.S. patent application Ser. No. 07/885,648, filed on May 19, 1992, now issued as U.S. Pat. No. 5,295,196 for "Method and Apparatus for Currency Discrimination and Counting," which is incorporated herein by reference in its entirety.

In order to ensure strict correspondence between reflectance samples obtained by narrow dimension scanning of successive bills, the initiation of the reflectance sampling process is preferably controlled through the CPU 72 by means of an optical encoder 78 which is linked to the bill transport mechanism 56 and precisely tracks the physical movement of the bill 57 across the scanheads 60 and 62. More specifically, the optical encoder 78 is linked to the rotary motion of the drive motor which generates the movement imparted to the bill as it is relayed along the transport path. In addition, the mechanics of the feed mechanism (not shown, see U.S. Pat. No. 5,295,196 referred to above) ensure that positive contact is maintained between the bill and the transport path, particularly when the bill is being scanned by scanheads 60 and 62. Under these conditions, the optical encoder 78 is capable of precisely tracking the movement of the bill 57 relative to the light strip 58 generated by the scanhead 60 by monitoring the rotary motion of the drive motor.

The output of photodetector 68 is monitored by the CPU 72 to initially detect the presence of the bill underneath the scanhead 60 and, subsequently, to detect the starting point of the printed pattern on the bill, as represented by the thin borderline 57a which typically encloses the printed indicia on currency bills. Once the borderline 57a has been detected, the optical encoder 78 is used to control the timing and number of reflectance samples that are obtained from the output of the photodetector 68 as the bill 57 moves across the scanhead 60 and is scanned along its narrow dimension.

The detection of the borderline 57a serves as an absolute reference point for initiation of sampling. If the edge of a bill were to be used as a reference point, relative displacement of sampling points can occur because of the random manner in which the distance from the edge to the borderline 57a varies from bill to bill due to the relatively large range of tolerances permitted during printing and cutting of currency bills. As a result, it becomes difficult to establish direct correspondence between sample points in successive bill scans and the discrimination efficiency is adversely affected.

The use of the optical encoder 78 for controlling the sampling process relative to the physical movement of a bill 57 across the scanhead 60 is also advantageous in that the encoder 78 can be used to provide a predetermined delay following detection of the borderline prior to initiation of samples. The encoder delay can be adjusted in such a way that the bill 57 is scanned only across those segments along its narrow dimension which contain the most distinguishable printed indicia relative to the different currency bills.

It has been determined that the central, approximately two-inch portion of currency bills, as scanned across the central section of the narrow dimension of the bill, provides sufficient data for distinguishing among various currency denominations and/or series of both United States and foreign currency on the basis of the correlation technique disclosed in U.S. Pat. No. 5,295,196 referred to above. Accordingly, the optical encoder can be used to control the scanning process so that reflectance samples are taken for a set period of time and only after a certain period of time has elapsed since the borderline 57a has been detected, thereby restricting the scanning to the desired central portion of the narrow dimension of the bill.

Figure 5A:
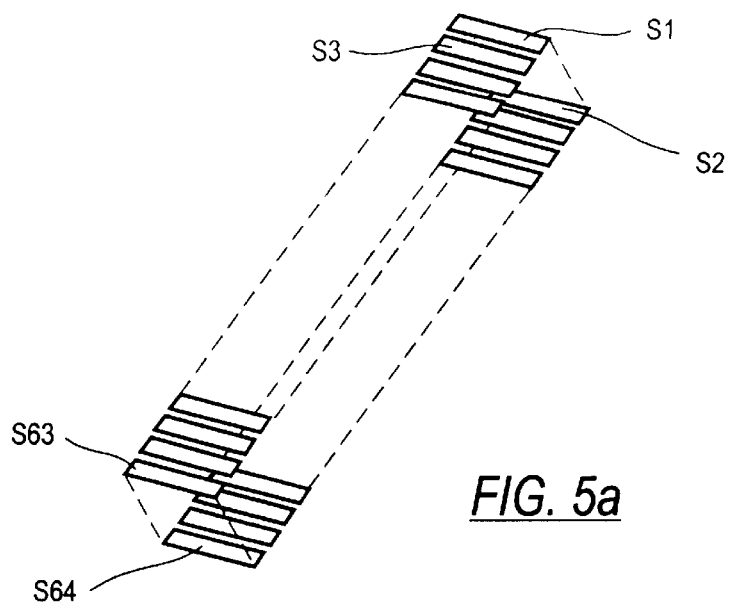
FIG. 5a is a diagrammatic perspective illustration of the successive areas scanned during the traversing movement of a single bill across an optical sensor in the system of FIG. 4.
Figure 5B:
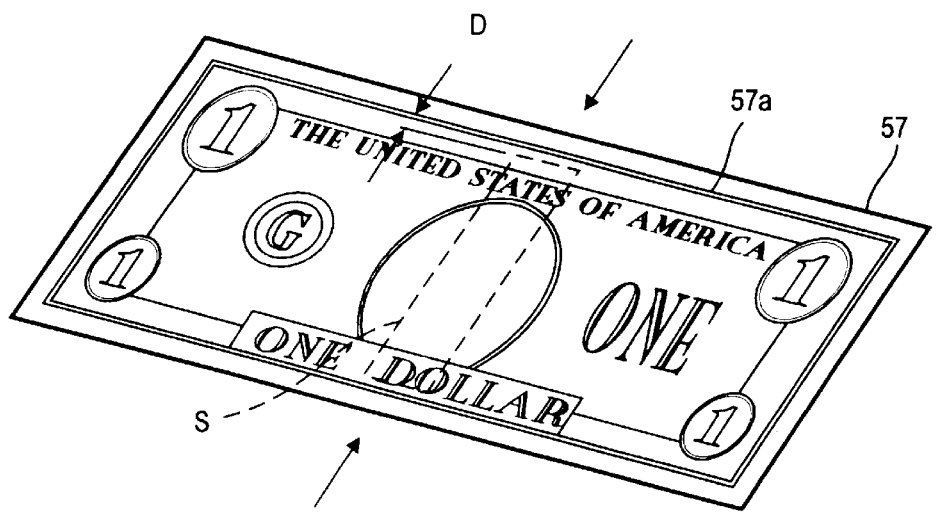
FIG. 5b is a perspective view of a bill and a preferred area to be optically scanned on the bill.
Figure 5C:
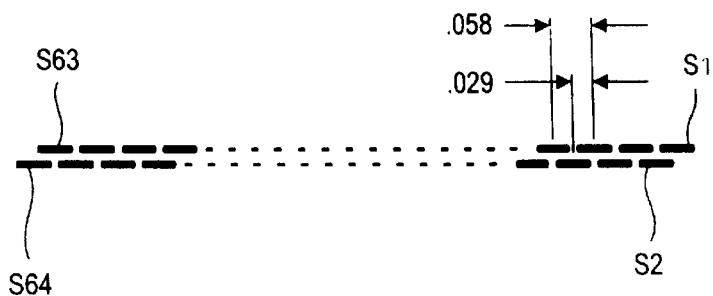
FIG. 5c is a diagrammatic side elevation of the scan area to be optically scanned on a bill.

FIGS. 5a–5c illustrate the scanning process of optical scanhead 60 in more detail. Referring to FIG. 5b, as a bill 57 is advanced in a direction parallel to the narrow edges of the bill, scanning via a wide slit in the scanhead 60 is effected along a segment S of the central portion of the bill 57. This segment S begins a fixed distance D inboard of the border line 57a. As the bill 57 traverses the scanhead 60, a strip s of the segment S is always illuminated, and the photodetector 68 produces a continuous output signal which is proportional to the intensity of the light reflected from the illuminated strip s at any given instant. This output is sampled at intervals controlled by the encoder, so that the sampling intervals are precisely synchronized with the movement of the bill across the scanhead 60.

As illustrated in FIGS. 5a and 5c, the sampling intervals are selected so that the strips s that are illuminated for successive samples overlap one another. The odd-numbered and even-numbered sample strips have been separated in FIGS. 5a and 5c to more clearly illustrate this overlap. For example, the first and second strips s1 and s2 overlap each other, the second and third strips s2 and s3 overlap each other, and so on. Each adjacent pair of strips overlap each other. In the illustrative example, this is accomplished by sampling strips that are 0.050 inch wide at 0.029 inch intervals, along a segment S that is 1.83 inch long (64 samples).

The optical sensing and correlation technique is based upon using the above process to generate a series of stored intensity signal patterns using genuine bills for each denomination and/or series of currency that is to be detected. According to a one embodiment, two or four sets of stored intensity signal samples are generated and stored within system memory, preferably in the form of an EPROM 80 (see FIG. 4), for each detectable currency denomination and/or series. The sets of stored intensity signal samples for each bill are generated from optical scans, performed on the green surface of the bill and taken along both the "forward" and "reverse" directions relative to the pattern printed on the bill. Alternatively, the optical scanning may be performed on the black side of U.S. currency bills or on either surface of foreign bills.

In adapting this technique to U.S. currency, sets of stored intensity signal samples are generated and stored for seven different denominations of U.S. currency, i.e., $1, $2, $5, $10, $20, $50 and $100. For example, in one embodiment of the present invention, four sets of stored intensity signal samples are generated for the $10 bill and the $2 bill and two sets of stored intensity signal samples are generated for $1, $5, $20, $50 and $100 bills, thus providing a master set of 18 different sets of stored intensity signal samples stored within the system memory for subsequent correlation purposes. Once the master set has been stored, the scanned first characteristic information, in this example being reflected light intensity signal samples, generated by scanning a bill under test is compared by the CPU 72 with each of the sets of stored intensity signal samples to generate, for each comparison, a correlation number representing the extent of correlation, i.e., similarity between corresponding ones of the plurality of data samples, for the sets of data being compared.

For those denominations having more than one series in circulation, (e.g., presently $100 bills), one embodiment of the present invention is designed to determine both the denomination and series of the scanned bills. To accomplish this, stored intensity signal samples are generated and stored for both older- and newer-series bills of the appropriate denominations. Thus, with respect to $100 bills, one embodiment of the present invention stores two sets each of stored intensity signals for the newer-series (1996+) and older-series (1996−) $100 bills It will be appreciated that the U.S. treasury is expected to introduce newer-series $50 and $20 bills in 1997 and 1998, respectively. The present invention will accommodate these and other new series of bills, as they are introduced, by storing appropriate intensity signal samples in the manner heretofore described.

The CPU 72 is programmed to identify the denomination and/or series of the scanned bill as corresponding to the set of stored intensity signal samples for which the correlation number resulting from pattern comparison is found to be the highest. In order to preclude the possibility of mischaracterizing the denomination and/or series of a scanned bill, as well as to reduce the possibility of spurious notes being identified as belonging to a valid denomination and/or series, a bi-level threshold of correlation is used as the basis for making a "positive" call. Such a method is disclosed in U.S. Pat. No. 5,295,196 referred to above.

As a result of the first comparison described above based on the reflected light intensity information retrieved by scanhead 60, the CPU 72 will have either determined the denomination and/or series of the scanned bill 57 or determined that the first scanned signal samples fail to sufficiently correlate with any of the sets of stored intensity signal samples. In the latter case, the CPU 72 generates an error signal indicating that the scanned bill is a "no call" or unidentified bill. The machine may then be stopped to allow removal of the no call bill, or the no call bill may be delivered to a separate output receptacle, as described in relation to the system 10 of FIG. 1*a*.

The error signal generated by the CPU 72 (FIG. 4) may comprise a voltage level, numerical value or any suitable recordable response indicating the occurrence of a "no call" or unidentified bill. The error signal may further indicate the time of occurrence of the "no call" bill, the operator, machine or any other suitable identifying characteristics associated with the "no call" bill. Additionally, the CPU 72 may calculate a running total (e.g., cumulative number) of "no call" error signals detected throughout a designated time interval or throughout a designated number of stacks. According to one embodiment of the present invention, the error signals and associated identifying characteristics generated by the CPU 72 is recorded into a random access memory (RAM) (not shown) associated with the system 50. It will be appreciated, however, that the signals generated by the CPU 72 may be recorded onto other types of memory or in other memory locations.

Provided that an error has not been generated as a result of the first comparison based on reflected light intensity characteristics, a second comparison is performed. This second comparison is performed based on a second type of characteristic information, such as alternate reflected light properties, similar reflected light properties at alternate locations of a bill, light transmissivity properties, various magnetic properties of a bill, the presence of a security thread embedded within a bill, the color of a bill, the thickness or other dimension of a bill, etc. The second type of characteristic information is retrieved from a scanned bill by the second scanhead 62. The scanning and processing by scanhead 62 may be controlled in a manner similar to that described above with regard to scanhead 60.

In addition to the sets of stored first characteristic information, in this example stored intensity signal samples, the EPROM 80 stores sets of stored second characteristic information for genuine bills of the different denominations and/or series which the system 50 is capable of handling. Based on the denomination and/or series indicated by the first comparison, the CPU 72 retrieves the set or sets of stored second characteristic data for a genuine bill of the denomination and/or series so indicated and compares the retrieved information with the scanned second characteristic information. If sufficient correlation exists between the retrieved information and the scanned information, the CPU 72 verifies the genuineness of the scanned bill 57. Otherwise, the CPU generates an error signal indicating the occurrence of a "suspect document" or counterfeit bill. While the embodiment illustrated in FIG. 4 depicts a single CPU 72 for making comparisons of first and second characteristic information and a single EPROM 80 for storing first and second characteristic information, it is understood that two or more CPUs and/or EPROMs could be used, including one CPU for making first characteristic information comparisons and a second CPU for making second characteristic information comparisons.

After performing the first and second comparisons described above, the CPU 72 will have either generated a "no call" error signal, generated a "suspect document" error signal or determined the denomination, series and authenticity of the scanned bill 57. Like the "no call" error signals described above, the "suspect document" error signals may comprise a voltage level, numerical value or any suitable recordable response indicating the occurrence of a "suspect document" or counterfeit bill. In one embodiment, the error signal associated with a "suspect document" further records the type of comparison test (e.g., UV, flourescence, magnetic, etc.) which generated the error signal. In another embodiment, upon generation of an error signal, the CPU 72 recalls from system memory identificatory information associated with the particular machine such as, for example, an operator- or factory-assigned identification number, so that the reviewable record will indicate which machine generated the error signal. In yet another embodiment, the individual currency discriminators and counters are provided with internal clocks or sychronized to an external clock to facilitate time-based records associated with the error signals. Additionally, the CPU 72 may calculate a running total (e.g., cumulative number) of suspect documents detected throughout a designated time interval or throughout a designated number of stacks. Because the denomination and/or series of the scanned bills have already been predetermined by the first comparison (in a currency discriminator) or by the human operator (in a counter), the "suspect document" error signals generated by the CPU 72 as a result of the second comparison may include the denomination and/or series of each of the suspect documents in addition to any of the several other identifying characteristics described above.

It will be appreciated that any or all of the above features may be selectively combined into a single currency discriminator or counter. It will further be appreciated that any information recorded by a single discriminator or counter may be communicated to a local system controller or central controller, as previously described, to provide an aggregate record of information associated with no call documents, suspect documents or genuine documents compiled from a network of individual machines.

According to one embodiment of the present invention, the "no call" and "suspect document" error signals and associated identifying characteristics generated by the CPU 72 is recorded into a random access memory (RAM) (not shown) associated with the system 50. It will be appreciated, however, that the signals generated by the CPU 72 may be recorded onto other types of memory or in other memory locations. For example, in the aforementioned embodiment in which individual machines are networked together in communication with a local system controller or central controller, the various error signals and information associated with the various error signals may be stored in the system memory of any combination of individual machines, local system controllers and central controllers.

The recorded error signals and associated identifying characteristics generated by the CPU 72 in any individual machine provides a record of error signals occurring in a particular machine throughout a designated time interval or throughout a designated number of reviewed documents. The CPU 72 is further adapted to count the number of bills belonging to a particular currency denomination and/or series whose genuineness has been verified as part of a given set of bills that have been scanned for a given scan batch, and to determine the aggregate number or value of the currency bills scanned during a scan batch. The CPU 72 is also linked to an output unit 82 which may be programmed to provide a display of the number of genuine bills counted, the breakdown of the genuine bills and/or suspect bills in terms of currency denomination and/or series, the aggregate number or value of no call, suspect or genuine bills, or any other recorded identifying characteristic of the no call, suspect or genuine bills. The output unit 82 can also be adapted to provide a print-out of the displayed information in a desired format.

Figure 6A:
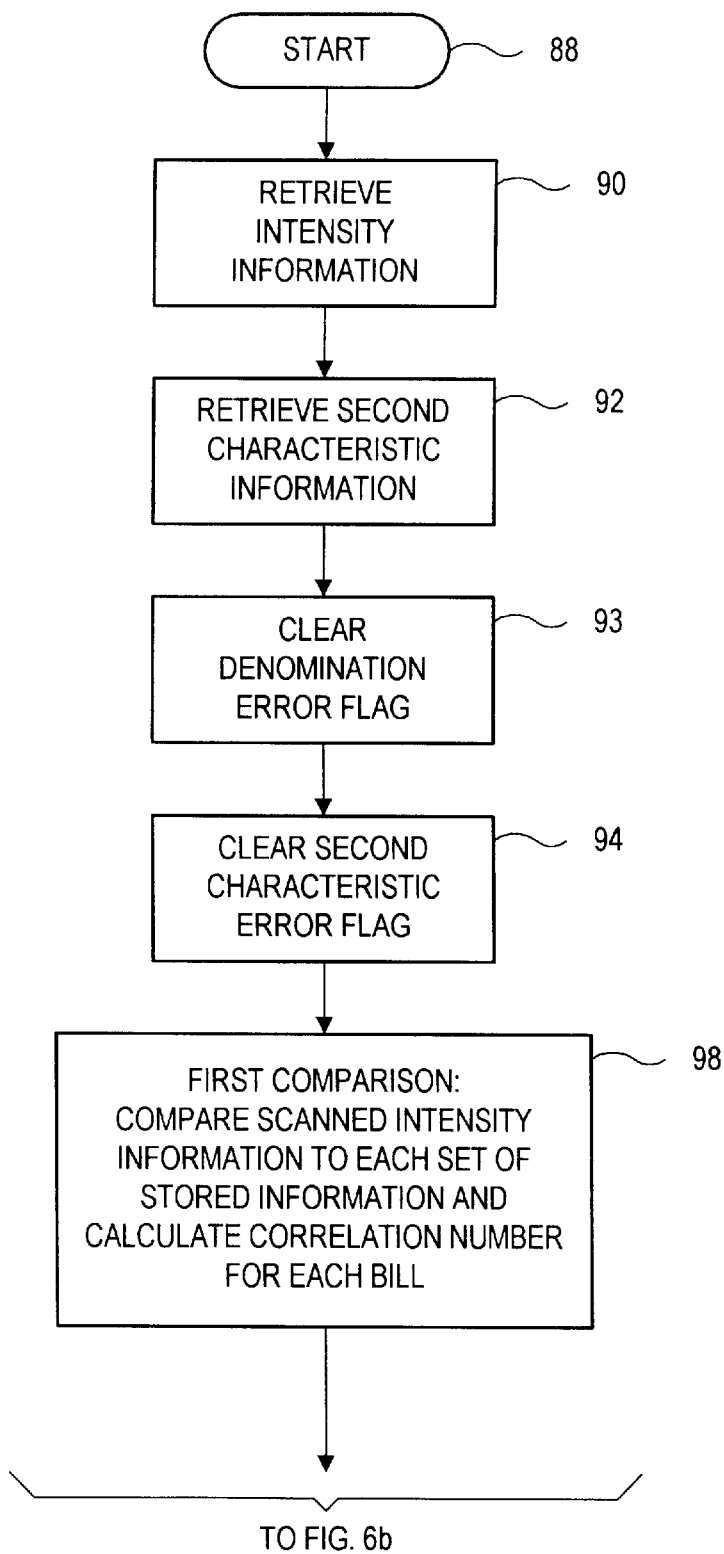
FIGS. 6a and 6b comprise a flowchart illustrating the sequence of operations involved in implementing the currency evaluation and recording system of FIG. 4 when employed with a currency discriminator.
Figure 6B:
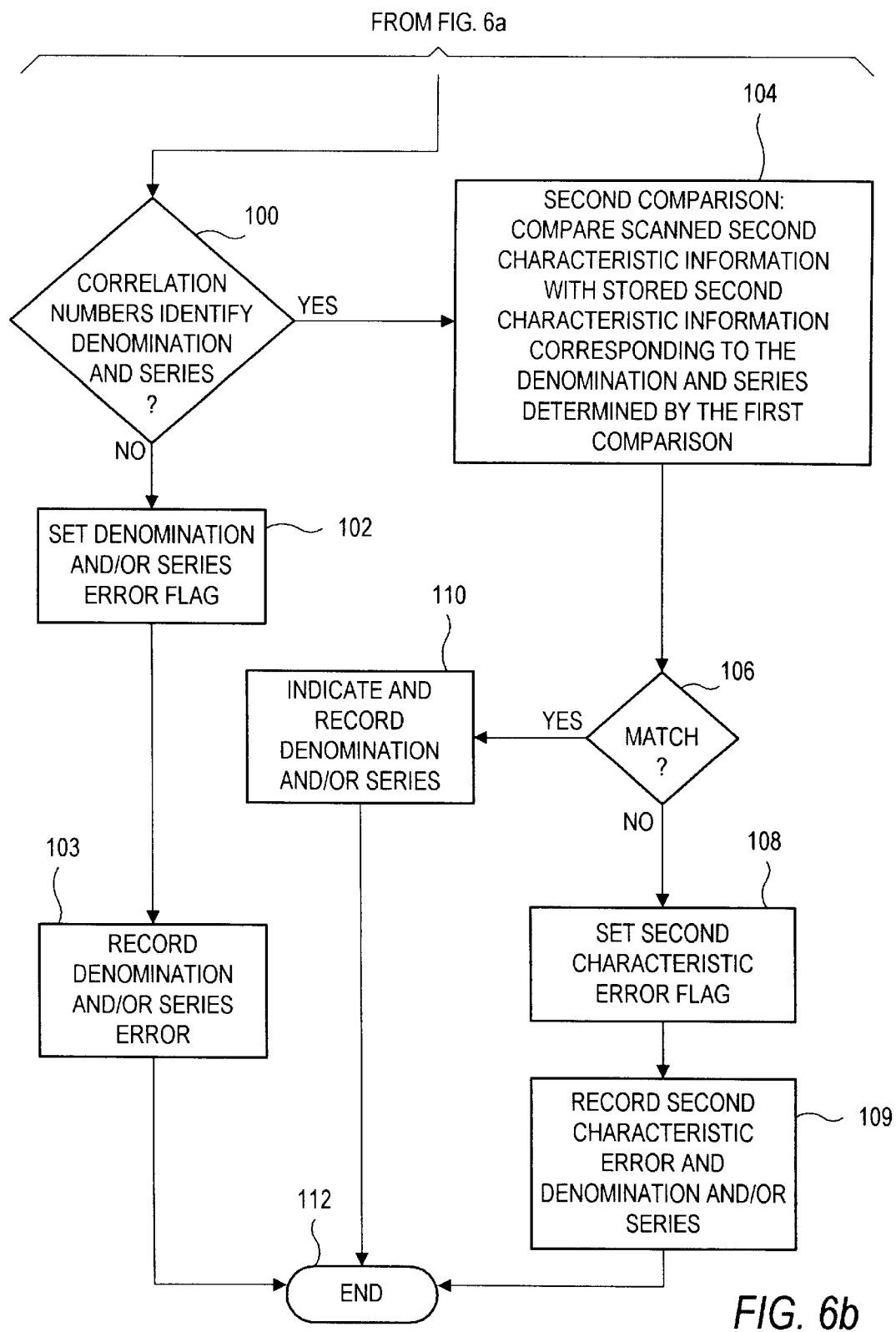

FIGS. 6a and 6b illustrate the sequence of operations involved in a currency discriminator using the discrimination and authentication sensors of FIG. 4 to obtain first and second types of characteristic information. Upon the initiation of the sequence of operations (step 88), reflected light intensity information is retrieved from a bill being scanned (step 90). Similarly, second characteristic information is also retrieved from the bill being scanned (step 92). Denomination error and second characteristic error flags are cleared (steps 93 and 94). Next, the scanned intensity information is compared to each set of stored intensity information corresponding to genuine bills of all denominations and/or series the system is programmed to accommodate (step 98). For each denomination and/or series, a correlation number is calculated. Then, based on the correlation numbers calculated, the system either determines the denomination and/or series of the scanned bill or generates a "no call" error by setting the denomination/series error flag (steps 100 and 102). In the case where the denomination/series error flag is set (step 102), a "no call" denomination error is recorded (step 103) and the process is ended (step 112). Alternatively, if based on this first comparison, the system is able to determine the denomination and/or series of the scanned bill, the system proceeds to compare the scanned second characteristic information with the stored second characteristic information corresponding to the denomination and/or series determined by the first comparison (step 104).

For example, if as a result of the first comparison the scanned bill is determined to be a $20 bill, the scanned second characteristic information is compared to the stored second characteristic information corresponding to a genuine $20 bill. In this manner, the system need not make comparisons with stored second characteristic information for the other denominations the system is programmed to accommodate. If based on this second comparison (step 104) it is determined that the scanned second characteristic information does not sufficiently match that of the stored second characteristic information (step 106), then a second characteristic error is generated by setting the second characteristic error flag (step 108). The second characteristic error (e.g. "suspect document" error) and the denomination and/or series of the suspect document is recorded at step 109, and the process is ended at step 112. If the second comparison results in a sufficient match between the scanned and stored second characteristic information (step 106), then the denomination and/or series of the authenticated bill is indicated and recorded (step 110) and the process is ended (step 112).

Figure 6C:
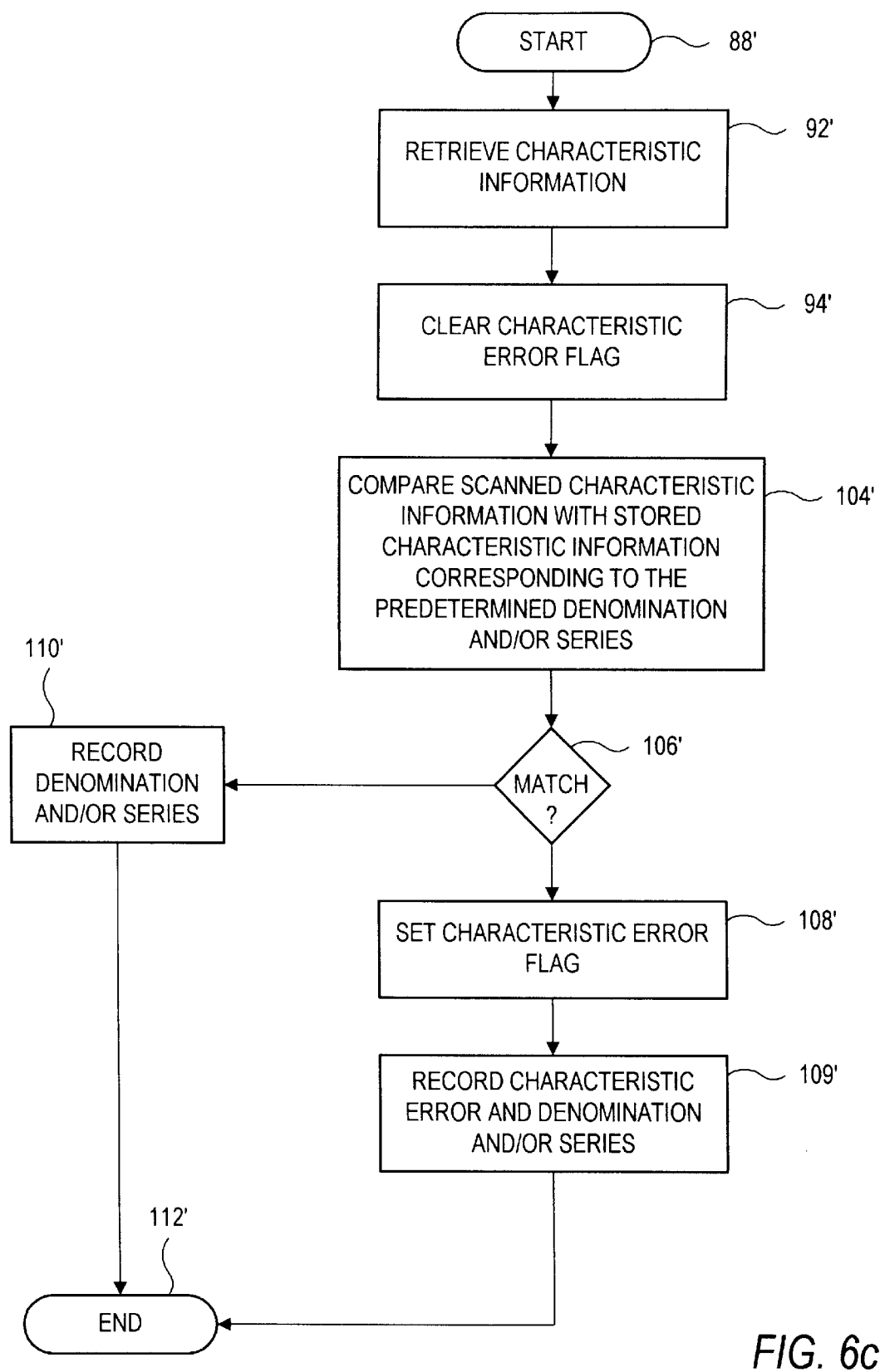
FIG. 6c is a flowchart illustrating the sequence of operations involved in implementing the currency evaluation and recording system of FIG. 4 when employed with a counter.

FIG. 6c illustrates the sequence of operations involved in a counter adapted to accommodate bills having a pre-specified denomination and/or series and using the authentication sensors of FIG. 4. Upon the initiation of the sequence of operations (step 88'), characteristic information is retrieved from the bill being scanned (step 92'). Characteristic error flags are cleared (step 94'). Next, in step 104', the system proceeds to compare the scanned characteristic information with stored characteristic information corresponding to the predetermined denomination and/or series of the bill.

For example, if the predetermined denomination of a bill is $20, scanned characteristic information is obtained from the bill and compared to stored characteristic information corresponding to a genuine $20 bill. In this manner, the system need not make comparisons with stored characteristic information for the other denominations the system is programmed to accommodate. If based on this comparison (step 104') it is determined that the scanned characteristic information does not sufficiently match that of the stored characteristic information (step 106'), then a characteristic error is generated by setting the characteristic error flag (step 108'). The characteristic error (e.g. "suspect document" error) and the denomination and/or series of the suspect document is recorded at step 109', and the process is ended at step 112'. If the second comparison results in a sufficient match between the scanned and stored second characteristic information (step 106'), then the denomination and/or series of the authenticated bill is indicated and recorded (step 110') and the process is ended (step 112').

TABLE 1a

| Sensitivity Denomination | 1 | 2 | 3 | 4 | 5 |
|---|---|---|---|---|---|
| $1 | 50 | 100 | 150 | 200 | 250 |
| $2 | 75 | 150 | 225 | 300 | 375 |
| $5 | 55 | 110 | 165 | 220 | 275 |
| $10 | 40 | 80 | 120 | 160 | 200 |
| $20 | 45 | 90 | 135 | 180 | 225 |
| $50 | 55 | 110 | 165 | 220 | 275 |
| $100 | 50 | 100 | 150 | 200 | 250 |

TABLE 1b

| Sensitivity Denomination | 6 | 7 | 8 | 9 | 10 |
|---|---|---|---|---|---|
| $1 | 300 | 350 | 400 | 450 | 500 |
| $2 | 450 | 525 | 600 | 675 | 750 |
| $5 | 330 | 385 | 440 | 495 | 550 |
| $10 | 240 | 280 | 320 | 360 | 400 |
| $20 | 270 | 315 | 360 | 405 | 450 |
| $50 | 330 | 385 | 440 | 495 | 550 |
| $100 | 300 | 350 | 400 | 450 | 500 |

An example of an interrelationship between authentication based on a first and second characteristic can be seen by considering Tables 1a and 1b. Table 1a depicts relative total magnetic content minimum thresholds for various denominations of genuine bills, with columns 1–5 represent sensitivity levels 1–5 which may be selected by a user of a device employing the present invention. Table 1b similarly depicts relative total magnetic content minimum thresholds for various denominations of genuine bills, corresponding to selectable sensitivity levels 6–10. The values in Table 1a and 1b are set based on the scanning of genuine bills of varying denominations for total magnetic content and setting required minimum thresholds based on the degree of sensitivity selected. The information in Tables 1a and 1b is based on the total magnetic content of a genuine $1 being 1000. The following discussion is based on a sensitivity setting of 4. In this example it is assumed that magnetic content represents the second characteristic tested. If the comparison of first characteristic information, such as reflected light intensity, from a scanned billed and stored information corresponding to genuine bills results in an indication that the scanned bill is a $10 denomination, then the total magnetic content of the scanned bill is compared to the total magnetic content minimum threshold of a genuine $10 bill at selected sensitivity level 4, i.e., 160. If the magnetic content of the scanned bill is less than 160, the bill is rejected. Otherwise it is accepted as a $10 bill.

In another embodiment of the present invention, a table of threshold values may be prepared by scanning genuine bills of varying denominations for total magnetic content and setting both minimum and maximum total magnetic content thresholds for each sensitivity level. A bill under test is authenticated if its total magnetic content exceeds the minimum threshold and does not exceed the maximum threshold, e.g. within an acceptable range of values defined between the minimum and maximum thresholds. Conversely, a bill under test is rejected if its total magnetic content is not within the acceptable range of values. The ranges associated with the various sensitivity levels may be modified (e.g., narrowed or broadened), in order to evaluate the documents more or less closely, as needed or desired. Additionally or alternatively, the type of data used to authenticate bills may also be varied depending on the denomination or series of bills. For example, it may be determined that magnetic data is preferable to optical data for evaluating a certain denomination or series of bills.

Selection of sensitivity levels according to the present invention may be accomplished in various ways. For instance, in one embodiment of the present invention, a single sensitivity level (e.g., level 4) may be applied to each denomination and/or series of bill. In another embodiment of the present invention, sensitivity levels are independently selected for various denominations and/or series of bills (e.g., level 4 for $10 bills, level 5 for pre-1996 series $100 bills, level 6 for new series $100 bills).

According to another feature of the present invention, the doubling or overlapping of bills in the transport system is detected by the provision of a pair of optical sensors which are co-linearly disposed opposite to each other within the scan head area along a line that is perpendicular to the direction of bill flow, i.e., parallel to the edge of test bills along their wide dimensions as the bills are transported across the optical scan head. The pair of optical sensors S1 and S2 (not shown) are co-linearly disposed within the scan head area in close parallelism with the wide dimension edges of incoming test bills. In effect, the optical sensors S1 and S2 (having corresponding light sources and photodetectors—not shown) are disposed opposite each other along a line within the scan head area which is perpendicular to the direction of bill flow. These sensors S1 and S2 serve as second detectors for detecting second characteristic information, namely density.

Although not illustrated in the drawings, it should be noted that corresponding photodetectors (not shown) are provided within the scanhead area in immediate opposition to the corresponding light sources and underneath the flat section of the transport path. These detectors detect the beam of coherent light directed downwardly onto the bill transport path from the light sources corresponding to the sensors S1 and S2 and generate an analog output which corresponds to the sensed light. Each such output is converted into a digital signal by a conventional ADC convertor unit (not shown) whose output is fed as a digital input to and processed by the system CPU (not shown), in a manner similar to that indicated in the arrangement of FIG. 4.

The presence of a bill which passes under the sensors S1 and S2 causes a change in the intensity of the detected light, and the corresponding change in the analog output of the detectors serves as a convenient means for density-based measurements for detecting the presence of "doubles" (two or more overlaid or overlapped bills) during the currency recognition and counting process. For instance, the sensors may be used to collect a predefined number of density measurements on a test bill, and the average density value for a bill may be compared to predetermined density thresholds (based, for instance, on standardized density readings for master bills) to determine the presence of overlaid bills or doubles. The above sensors and doubles detection technique is described in more detail in U.S. Pat. No. 5,295,196 which is incorporated herein by reference.

Figure 7:
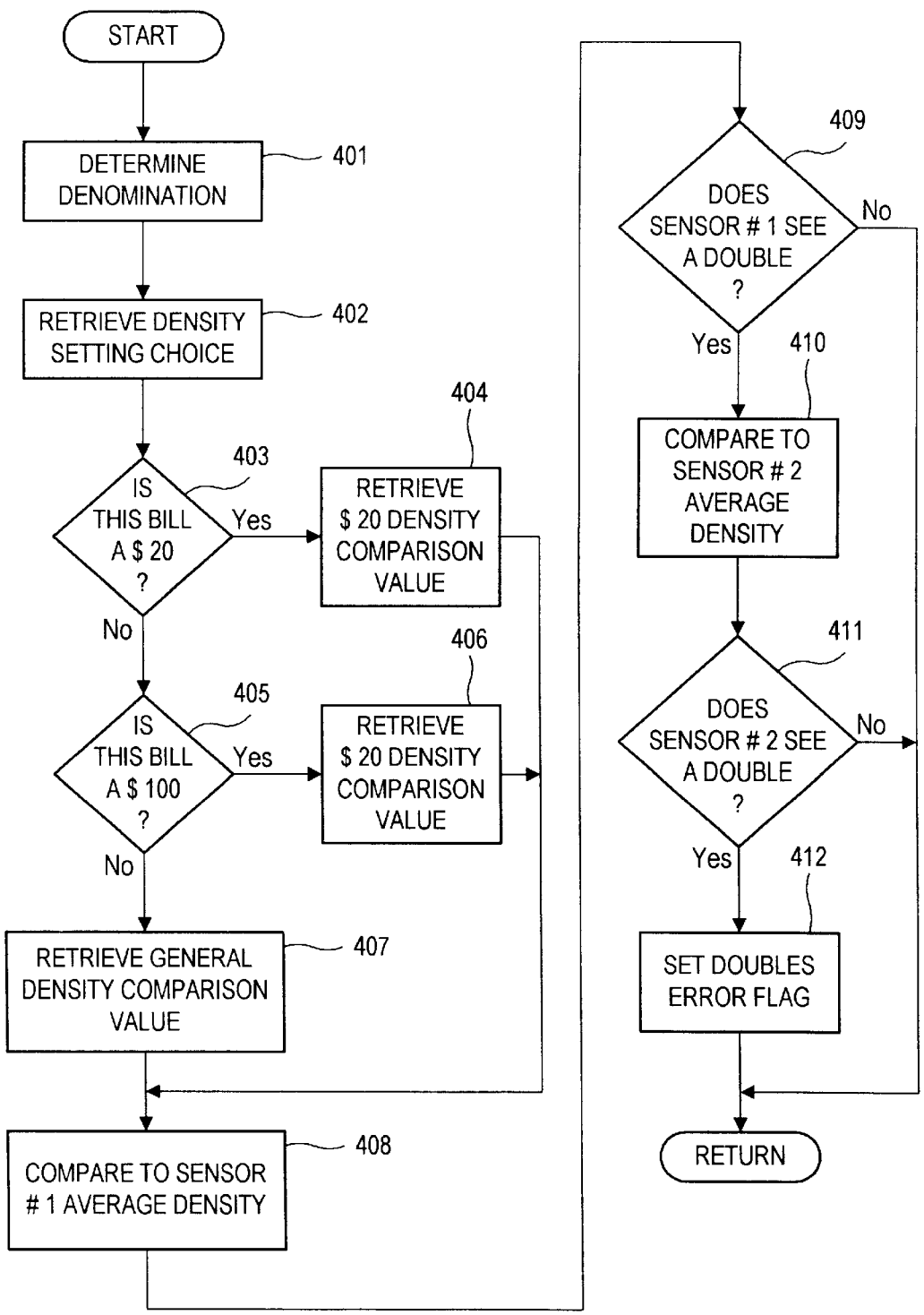
FIG. 7 is a flowchart illustrating the sequence of operations involved in implementing the detection of double or overlapping bills in the system of FIG. 4.

A routine for using the outputs of the two sensors S1 and S2 to detect any doubling or overlapping of bills is illustrated in FIG. 7. This routine uses a determination of the denomination of a bill based on first characteristic information to streamline doubles detection wherein second characteristic information corresponds to the density of scanned bills. This routine starts when the denomination of a scanned bill has been determined via comparing first characteristic information at step 401, as described previously. To permit variations in the sensitivity of the density measurement, a "density setting choice" is retrieved from memory at step 402. The operator makes this choice manually, according to whether the bills being scanned are new bills, requiring a higher degree of sensitivity, or used bills, requiring a lower level of sensitivity. After the "density setting choice" has been retrieved, the system then proceeds through a series of steps which establish a density comparison value according to the denomination of the bill. Thus, step 403 determines whether the bill has been identified as a $20-bill, and if the answer is affirmative, the $20-bill density comparison value is retrieved from memory at step 404. A negative answer at step 443 advances the system to step 405 to determine whether the bill has been identified as a $100-bill, and if the answer is affirmative, the $100-bill density comparison value is retrieved from memory at step 406. A negative answer at step 405 advances the system to step 407 where a general density comparison value, for all remaining bill denominations, is retrieved from memory.

At step 408, the density comparison value retrieved at step 404, 406 or 407 is compared to the average density represented by the output of sensor S1. The result of this comparison is evaluated at step 409 to determine whether the output of sensor S1 identifies a doubling of bills for the particular denomination of bill determined at step 401. If the answer is negative, the system returns to the main program. If the answer is affirmative, step 410 then compares the retrieved density comparison value to the average density represented by the output of the second sensor S2. The result of this comparison is evaluated at step 411 to determine whether the output of sensor S2 identifies a doubling of bills. Affirmative answers at both step 409 and step 411 results in the setting of a "doubles error" flag at step 412, and the system then returns to the main program. The above doubles detection routine is described in more detail in U.S. Pat. No. 5,295,196 which is incorporated herein by reference. While the routine described above uses second characteristic information (density) to detect doubles, the above routine may be modified to authenticate bills based on their density, for example in a manner similar to that described in connection with Table 1.

Figure 8A:
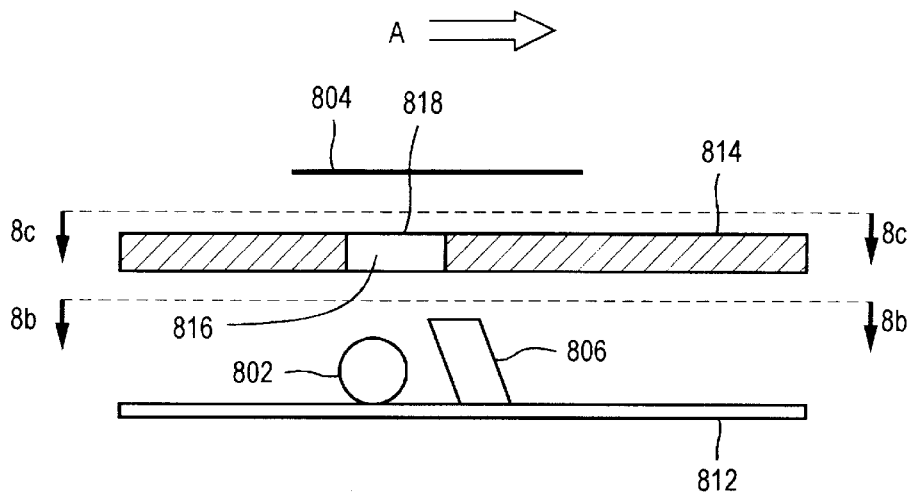
FIG. 8a is a side view of an authentication system which may be used in the system of FIG. 4 according to one embodiment of the present invention.
Figure 8B:
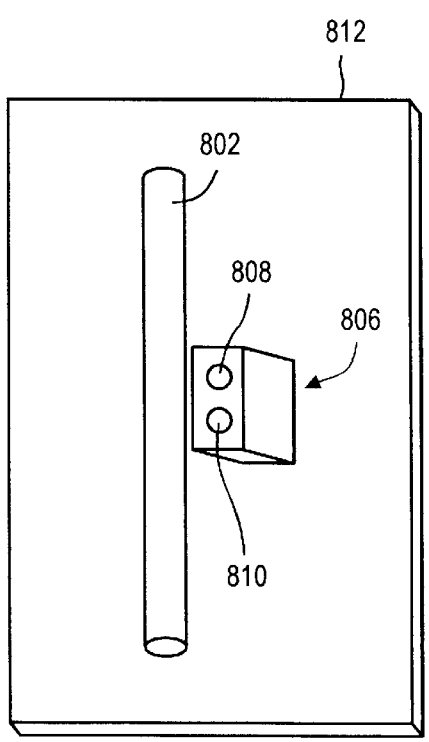
FIG. 8b is a top view of the embodiment of FIG. 8a along the direction 8b.
Figure 8C:
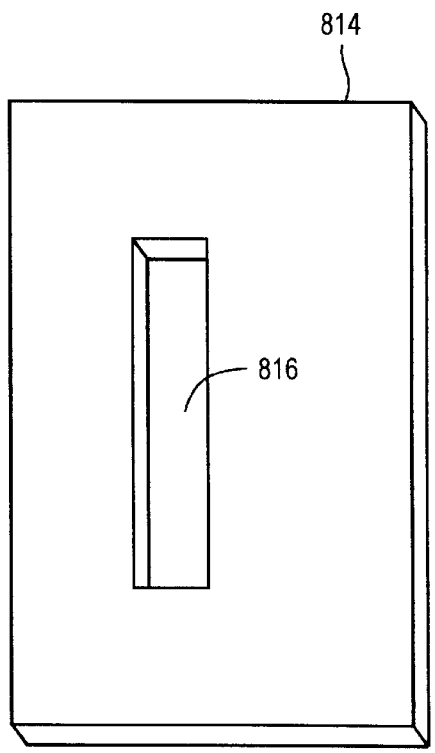
FIG. 8c is a top view of the embodiment of FIG. 8a along the direction 8c.

Referring now to FIG. 8*a*, there is shown a side view of another embodiment of a document authentication system according to the present invention. The document authentication system may be employed in a document discriminator or counter. FIG. 8b is a top view of the embodiment of FIG. 8a along the direction 8b, and FIG. 8c is a top view of the embodiment of FIG. 8a along the direction 8c, respectively. An ultraviolet ("UV") light source 802 illuminates a document 804. Depending upon the characteristics of the document, ultraviolet light may be reflected off the document and/or fluorescent light may be emitted from the document. A detection system 806 is positioned so as to receive any light reflected or emitted toward it but not to receive any UV light directly from the light source 802. The detection system 806 comprises a UV sensor 808, a fluorescence sensor 810, filters, and a plastic housing. The light source 802 and the detection system 806 are both mounted to a printed circuit board 812. The document 804 is transported in the direction indicated by arrow A by a transport system (not shown). The document is transported over a transport plate 814 which has a rectangular opening 816 in it to permit passage of light to and from the document. In one embodiment of the present invention, the rectangular opening 816 is 1.375 inches (3.493 cm) by 0.375 inches (0.953 cm). To minimize dust accumulation onto the light source 802 and the detection system 806 and to prevent document jams, the opening 816 is covered with a transparent UV transmitting acrylic window 818. To further reduce dust accumulation, the UV light source 802 and the detection system 806 are completely enclosed within a housing (not shown) comprising the transport plate 814.

Figure 9:
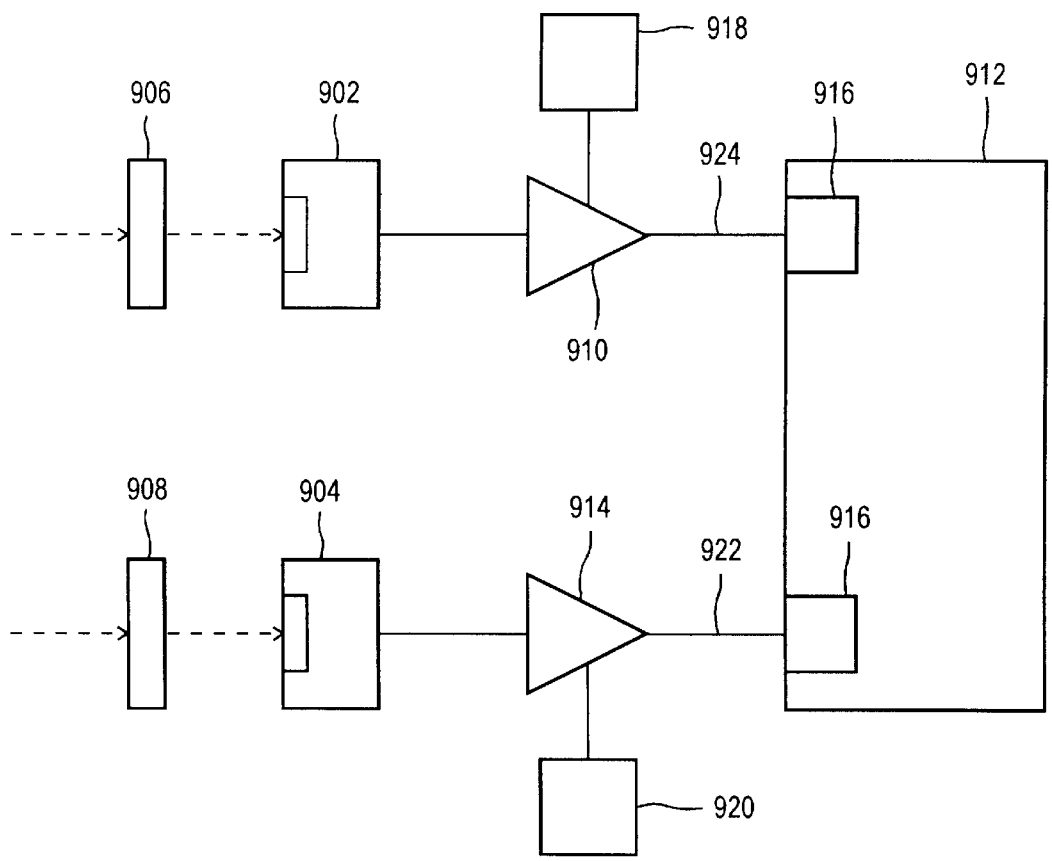
FIG. 9 is a functional block diagram of an authentication system which may be used in the system of FIG. 4 according to another embodiment of the present invention.

Referring now to FIG. 9, there is shown a functional block diagram illustrating another embodiment of a document authentication system according to the present invention. FIG. 9 shows an UV sensor 902, a fluorescence sensor 904, and filters 906, 908 of a detection system such as the detection system 806 of FIG. 8a. Light from the document passes through the filters 906, 908 before striking the sensors 902, 904, respectively. An ultraviolet filter 906 filters out visible light and permits UV light to be transmitted and hence to strike UV sensor 902. Similarly, a visible light filter 908 filters out UV light and permits visible light to be transmitted and hence to strike fluorescence sensor 904. Accordingly, UV light, which has a wavelength below 400 nm, is prevented from striking the fluorescence sensor 904 and visible light, which has a wavelength greater than 400 nm, is prevented from striking the UV sensor 902. In one embodiment, the UV filter 906 transmits light having a wavelength between about 280 nm and about 380 nm and has a peak transmittance at 360 nm. In one embodiment, the visible light filter 908 is a blue filter and transmits light having a wavelength between about 415 nm and about 620 nm and has a peak transmittance at 450 nm. The above blue filter comprises a combination of a blue component filter and a yellow component filter. The blue component filter transmits light having a wavelength between about 320 nm and about 620 nm and has a peak transmittance at 450 nm. The yellow component filter transmits light having a wavelength between about 415 nm and about 2800 nm. Examples of suitable filters are UG1 (UV filter), BG23 (blue bandpass filter), and GG420 (yellow longpass filter), all manufactured by Schott. In one embodiment the filters are about 8 mm in diameter and about 1.5 mm thick.

The UV sensor 902 outputs an analog signal proportional to the amount of light incident thereon and this signal is amplified by amplifier 910 and fed to a microcontroller 912. Similarly, the fluorescence sensor 904 outputs an analog signal proportional to the amount of light incident thereon and this signal is amplified by amplifier 914 and fed to a microcontroller 912. Analog-to-digital converters 916 within the microcontroller 912 convert the signals from the amplifiers 910, 914 to digital and these digital signals are processed by the software of the microcontroller 912. The UV sensor 902 may be, for example, an ultraviolet enhanced photodiode sensitive to light having a wavelength of about 360 nm and the fluorescence sensor 904 may be a blue enhanced photodiode sensitive to light having a wavelength of about 450 nm. Such photodiodes are available from, for example, Advanced Photonix, Inc., Massachusetts. The microcontroller 912 may be, for example, a Motorola 68HC16.

The exact characteristics of the sensors 902, 904 and the filters 906, 908 including the wavelength transmittance ranges of the above filters are not as critical to the present invention as the prevention of the fluorescence sensor from generating an output signal in response to ultraviolet light and the ultraviolet sensor from generating an output signal in response to visible light. For example, instead of, or in addition to, filters, a authentication system according to the present invention may employ an ultraviolet sensor which is not responsive to light having a wavelength longer than 400 nm and/or a fluorescence sensor which is not responsive to light having a wavelength shorter than 400 nm.

Calibration potentiometers 918, 920 permit the gains of amplifiers 910, 914 to be adjusted to appropriate levels. Calibration may be performed by positioning a piece of white fluorescent paper on the transport plate 814 so that it completely covers the rectangular opening 816 of FIG. 1. The potentiometers 918, 920 may then be adjusted so that the output of the amplifiers 910, 914 is 5 volts. Alternatively, calibration may be performed using genuine currency such as a piece of genuine U.S. currency. Potentiometers 918 and 920 may be replaced with electronic potentiometers located, for example, within the microcontroller 912. Such electronic potentiometers may permit automatic calibration based on the processing of a single genuine document or a plurality of documents as will be described below.

The implementation of one embodiment of a document authenticating system as illustrated in FIG. 9 will hereinafter be described with respect to the authentication of U.S. currency. However, it will be appreciated that the system may also be used to authenticate foreign currency or other types of documents in which reflectance and flourescence characteristics of genuine documents are known.

It has been determined that genuine United States currency reflects a relatively high amount of ultraviolet light, e.g. above a minimum UV threshold value, and does not fluoresce under ultraviolet illumination. A currency bill under test may thereby be rejected as counterfeit if it reflects an amount of UV light less than the minimum UV threshold value or flouresces under ultraviolet illumination. However, it has been determined that some counterfeit bills may reflect an even higher amount of ultraviolet light than genuine United States currency. Accordingly, in a preferred embodiment, the authentication system according to the present invention compares the amount of reflected ultraviolet light from a currency bill under test to a maximum UV threshold value as well as a minimum UV threshold value. A currency bill under test will thereby be classified as genuine only if it reflects an amount of ultraviolet light greater than the minimum UV threshold and less than the maximum UV threshold, e.g. within an acceptable range of values defined between a minimum and maximum UV threshold. Additionally, the system may be designed to detect flourescence levels in order to reject bills which flouresce in response to being illuminated with ultraviolet light.

Under ultraviolet illumination, counterfeit bills under test will exhibit one of the six sets of characteristics listed below:

1) Reflects below the minimum level of ultraviolet light and fluoresces;
2) Reflects below the minimum level of ultraviolet light and does not fluoresce;
3) Reflects an intermediate level of ultraviolet light and flouresces;
4) Reflects an intermediate level of ultraviolet light and does not flouresce;
5) Reflects higher than the maximum level of ultraviolet light and fluoresces;
6) Reflects higher than the maximum level of ultraviolet light and does not fluoresce.

Counterfeit bills in categories (1), (2), (5) and (6) may be detected by a currency authenticator employing an ultraviolet light reflection test according to a preferred embodiment of the present invention. Counterfeit bills in category (3) may be detected by a currency authenticator employing both an ultraviolet reflection test and a fluorescence test according to another preferred embodiment of the present invention. Only counterfeit bills in category (4) are not detected by the authenticating methods of the present invention.

As indicated above, genuine United States currency does not fluoresce under ultraviolet illumination. It has also been determined that British currency does not flouresce under ultraviolet illumination. According to a preferred embodiment of the present invention, fluorescence is determined by any signal that is above the noise floor. Thus, the amplified fluorescent sensor signal 922 will be approximately 0 volts for genuine U.S. or British currency and will vary between approximately 0 and 5 volts for counterfeit bills depending upon their fluorescent characteristics. Accordingly, an authenticating system according to a preferred embodiment of the present invention will reject bills when signal 922 exceeds approximately 0 volts.

According to one embodiment of the present invention, a low level of reflected UV light ("low" UV) is indicated when the amplified UV sensor signal 924 is below a predetermined minimum UV threshold. Conversely, a high level of reflected UV light ("high UV") is indicated when the amplified UV sensor signal 924 is above a predetermined maximum UV threshold. The value of the amplified UV sensor signal 924 is a function of lamp intensity and reflectance. Lamp intensity can degrade by as much as 50% over the life of the lamp and can be further attenuated by dust accumulation on the lamp and the sensors. The problem of dust accumulation is mitigated by enclosing the lamp and sensors in a housing as discussed above. An authenticating system according to a preferred embodiment of the present invention tracks the intensity of the UV light source and readjusts the minimum and maximum UV thresholds accordingly. The degradation of the UV light source may be compensated for by periodically feeding a genuine bill into the system, sampling the output of the UV sensor, and adjusting the thresholds accordingly. Alternatively, degradation may be compensated for by periodically sampling the output of the UV sensor when no bill is present in the rectangular opening 816 of the transport plate 814. It is noted that a certain amount of UV light is always reflected off the acrylic window 818. By periodically sampling the output of the UV sensor when no bill is present, the system can compensate for light source degradation. Furthermore, such sampling could also be used to indicate to the operator of the system when the ultraviolet light source has burned out or otherwise requires replacement. This may be accomplished, for example, by means of a display reading or an illuminated light emitting diode ("LED"). The amplified ultraviolet sensor signal 924 will initially vary between 1.0 and 5.0 volts depending upon the UV reflectance characteristics of the document being scanned and will slowly drift downward as the light source degrades. In an alternative preferred embodiment to a preferred embodiment wherein the threshold level is adjusted as the light source degrades, the sampling of the UV sensor output may be used to adjust the gain of the amplifier 910 thereby maintaining the output of the amplifier 910 at its initial levels.

In one embodiment of the present invention, the maximum and minimum UV thresholds are set at approximately 50% above and below the expected value of a genuine United States bill. For example, if a genuine U.S. bill generates an amplified UV output sensor signal 924 of 4.0 volts, the minimum threshold value is set at 2.0 volts and the maximum threshold value is set at 6.0 volts. Documents generating an amplified UV output sensor signal 924 of 2.0 volts or less will thereby be rejected as counterfeit, as will those generating an amplified UV output sensor signal 924 of 6.0 volts or higher. As described above, the upper and lower thresholds may either be lowered as the light source degrades or the gain of the amplifier 910 may be adjusted so that the upper and lower thresholds remain at approximately 50% above and below the amplified UV output sensor signal 924 of a genuine bill.

In an alternative embodiment, the determination of whether the level of UV reflected off a document is above or below a given threshold may be made by sampling the output of the UV sensor at a number of intervals, averaging the readings, and comparing the average level with the appropriate threshold level. Alternatively, a comparison may be made by measuring the amount of UV light reflected at a number of locations on the bill and comparing these measurements with those obtained from genuine bills. Alternatively, the output of one or more UV sensors may be processed to generate one or more patterns of reflected UV light and these patterns may be compared to the patterns generated by genuine bills. Such a pattern generation and comparison technique may be performed by modifying an optical pattern technique such as that disclosed in U.S. Pat. No. 5,295,196 incorporated herein by reference in its entirety or in U.S. patent application Ser. No. 08/287,882 filed Aug. 9, 1994 for a "Method and Apparatus for Document Identification," incorporated herein by reference in its entirety.

In a similar manner, the presence of fluorescence may be performed by sampling the output of the fluorescence sensor at a number of intervals. With respect to either U.S. or British currency, a bill is rejected as counterfeit if any of the sampled outputs rise above the noise floor. However, alternative methods may be employed with respect to currencies of other countries or other types of documents which may employ as security features certain locations or patterns of fluorescent materials.

A currency authenticating system according to the present invention may be provided with means, such as a display, to indicate to the operator the reasons why a document has been rejected, e.g., messages such as "UV FAILURE" or "FLUORESCENCE FAILURE." A currency authenticating system according to the present invention may also permit the operator to selectively choose to activate or deactivate either the UV reflection test or the fluorescence test or both. A currency authenticating system according to the present invention may also be provided with means for adjusting the sensitivities of the UV reflection and/or fluorescence test, for example, by adjusting the respective thresholds. For example, a system according to the present invention may permit the high/low threshold to be adjusted, for example, either in absolute voltage terms or in genuine/suspect ratio terms.

The UV and fluorescence authentication test may be incorporated into various document handlers such as currency counters and/or currency denomination discriminators such as that disclosed in connection with FIG. 4 and U.S. Pat. No. 5,295,196 incorporated herein by reference in its entirety. Likewise, the magnetic authentication tests described above may likewise be incorporated in such counters and/or discriminators. In such systems, calibration may be performed by processing a stack of genuine documents. An example of a method of calibrating such a device will now be discussed.

As mentioned above, the acrylic window 818 reflects a certain amount of UV light even when no bill is present. The amount of UV light reflected in the absence of bills is measured. A stack of genuine bills may then be processed with the potentiometer 918 set to some arbitrary value and the resulting UV readings averaged. The difference between the average reading and the reading made in the absence of bills may then be calculated. The potentiometer 918 may then be adjusted so that the average reading would be at least 0.7 volts greater then the no bill reading. It is also desirable to adjust the potentiometer 918 so that the amplifier 910 operates around the middle of its operating range. For example, if a reading of 1.0 volt results when no bills are present and an average reading of 3.0 volts results when a stack of genuine bills are processed, the resulting difference is 2.0 volts which is greater than 0.7 volts. However, it is desirable for the amplifier to be operating in the range of about 2.0 to 2.5 volts and preferably at about 2.0 volts. Thus in the above example, the potentiometer 918 may be used to adjust the gain of the amplifier 910 so that an average reading of 2.0 volts would result. Where potentiometer 918 is an electronic potentiometer, the gain of the amplifier 910 may be automatically adjusted by the microcontroller 912. In general, when the average reading is too high the potentiometer is adjusted to lower the resulting values to the center of the operating range of the amplifier and vice versa when the average reading is too low.

According to another embodiment of the present invention, the operator of a document handling device such as a currency counter or a currency denomination discriminator is provided with the ability to adjust the sensitivity of a UV reflection test, a fluorescence test, and a magnetic test. For example, a note counter embodying a preferred embodiment of the present invention may provide the operator the ability to set the authentication tests to a high or a low sensitivity. For example, the note counter may be provided with a set up mode which enables the operator to adjust the sensitivities for each of the above tests for both the high and the low modes. This may be achieved through appropriate messages being displayed on, for example, display 82 of FIG. 4 and the input of selection choices via an input device such as a keyboard or buttons. In one embodiment, the device permits the operator to adjust the UV test, the fluorescent test, and the magnetic test in a range of sensitivities 1–10, with 10 being the most sensitive, or to turn each test off. The device permits setting the sensitivity as described above for the three authentication tests for both a low sensitivity (low denomination) mode and a high sensitivity (high denomination) mode. The above setting options are summarized in Table 2.

TABLE 2

| Mode | UV Test-Lower Sensitivity | UV Test-Upper Sensitivity | Fluorescent Test Sensitivity | Magnetic Test Sensitivity |
| --- | --- | --- | --- | --- |
| High | Off, 1–10 | Off, 1–10 | Off, 1–10 | Off, 1–10 |
| Low | Off, 1–10 | Off, 1–10 | Off, 1–10 | Off, 1–10 |
| 1,2,5,10,20,50,100 | Off, 1–10 | Off, 1–10 | Off, 1–10 | Off, 1–10 |

According to an alternate embodiment, the above high/low modes are replaced with denomination modes, for example, one for each of several denominations of currency (e.g., $1, $2, $5, $10, $20, $50 and $100). Similarly, for those denominations having newer series in circulation (e.g., $100 bills), the above high/low modes may be replaced with denomination/series modes, one for each denomination and/or series. For each denomination and/or series, the sensitivity of the three tests may be adjusted between 1–10 or off. According to one embodiment, the operator manually selects either the high or low mode or the appropriate denomination/series mode based on the value and/or series of the notes to be processed. This manual mode selection system may be employed in, for example, either a note counter or a currency denomination discriminator. According to another embodiment, the document handling system automatically selects either the high or low mode or the appropriate denomination/series mode based on the value and/or series of the notes being processed. This automatic mode selection system may be employed in systems capable of identifying the different values or kinds of documents, for example, a currency discriminator.

Accordingly, in the low mode or for low denomination modes (e.g., $1, $2) the three tests may be set to relatively low sensitivities (e.g., UV test set at 2, fluorescent test set at 5, and magnetic test set at 3). Conversely, in the high mode or for high denomination modes (e.g., $50, $100) the three tests may be set to relatively high sensitivities (e.g., UV test set at 5, fluorescent test set at 6, and magnetic test set at 7). In this way, authentication sensitivity may be increased when processing high value notes where the potential harm or risk in not detecting a counterfeit may be greater and may be decreased when processing low value notes where the potential harm or risk in not detecting a counterfeit is lesser and the annoyance of wrongly rejecting genuine notes is greater. Also the UV, fluorescent, and/or magnetic characteristics of genuine notes can vary due to number of factors such wear and tear or whether the note has been washed (e.g., detergents). As a result, the fluorescent detection of genuine U.S. currency, for example, may yield readings of about 0.05 or 0.06 volts.

According to one embodiment of the present invention, the UV and fluorescent thresholds associated with each of the ten sensitivity levels are set, for "older series" U.S. currency as shown in Table 3a. According to another embodiment, shown in Table 3b, the UV test (lower) thresholds are set at generally lower levels to authenticate newer series U.S. currency (e.g., post-1996 series $100 bills), with the UV test (upper) thresholds and flourescence test levels set at the same levels as shown in FIG. 3a. It will be appreciated, however, that any of the UV test (lower) thresholds, UV test (upper) thresholds and/or flourescence test levels may be adjusted, or not used, in various alternative embodiments to accommodate newer series U.S. currency, foreign currency or other documents having known reflectance characteristics.

TABLE 3a

| Sensitivity Level | UV Test-Lower (Volts) | UV Test-Upper (Volts) | Fluorescence Test (Volts) |
| --- | --- | --- | --- |
| 1 | 0.200 | 2.200 | 0.800 |
| 2 | 0.325 | 2.100 | 0.600 |
| 3 | 0.450 | 2.000 | 0.400 |
| 4 | 0.550 | 1.900 | 0.200 |
| 5 | 0.600 | 1.800 | 0.150 |
| 6 | 0.650 | 1.700 | 0.100 |
| 7 | 0.700 | 1.600 | 0.090 |
| 8 | 0.750 | 1.500 | 0.080 |
| 9 | 0.800 | 1.450 | 0.070 |
| 10 | 0.850 | 1.400 | 0.060 |

TABLE 3b

| Sensitivity Level | UV Test-Lower (Volts) | UV Test-Upper (Volts) | Fluorescence Test (Volts) |
| --- | --- | --- | --- |
| 1 | 0.160 | 2.200 | 0.800 |
| 2 | 0.260 | 2.100 | 0.600 |
| 3 | 0.360 | 2.000 | 0.400 |
| 4 | 0.440 | 1.900 | 0.200 |
| 5 | 0.480 | 1.800 | 0.150 |
| 6 | 0.520 | 1.700 | 0.100 |
| 7 | 0.560 | 1.600 | 0.090 |
| 8 | 0.600 | 1.500 | 0.080 |
| 9 | 0.640 | 1.450 | 0.070 |
| 10 | 0.680 | 1.400 | 0.060 |

In performing the UV test according to one embodiment, the no bill reflectance value is subtracted from resulting UV reflectance voltages associated with the scanning of a particular bill, and this difference is compared against the appropriate threshold value such as those in Table 3 in determining whether to reject a bill.

According to one embodiment, the potentiometer 920 associated with the fluorescence detector 204 is calibrated by processing a genuine note or stack of notes, as described above in connection with the calibration of the UV detector, and adjusted so that a reading of near 0 volts (e.g., about 0.1 volt) results. Magnetic calibration may be performed, for example, manually in conjunction with the processing of a genuine bill of known magnetic characteristics and adjusting the magnetic sensor to near the center of its range.

Upon a bill failing one or more of the above tests, an appropriate error message may be displayed such as "Suspect Document U - - - " for failure of the UV reflection test, "Suspect Document -F-" for failure of the fluorescent test, "Suspect Document - - - M" for failure of the magnetic test, or some combination thereof when more than one test is failed (e.g., "Suspect Document UF-" for failure of both the UV reflection test and the fluorescent test).

While the present invention has been described with reference to one or more particular embodiments, those skilled in the art will recognize that many changes may be made thereto without departing from the spirit and scope of the present invention, which is set forth in the following claims.

What is claimed is:

1. A currency processing system including a plurality of individual currency handling devices linked together in a network, the currency processing system comprising:
    at least one controller adapted to communicate with each of the currency handling devices and to receive information associated with suspect document error signals generated by each of the of the currency handling devices, the at least one controller being adapted to process the received information associated with suspect document error signals to derive a record of the number of suspect document error signals; and
    at least one system memory adapted to store the record of the number of suspect document error signals in a manner to permit subsequent recall;
    wherein each of the currency handling devices comprises
        an input receptacle adapted to receive a stack of currency bills;
        an evaluation region adapted to retrieve authenticating characteristic information from each of the bills;
        a transport mechanism adapted to transport the bills from the input receptacle, one at a time, past the evaluation region to at least one output receptacle; and
        a device processor adapted to authenticate each of the currency bills by comparing the retrieved authenticating characteristic information obtained from each of the bills to master authenticating information, the processor being adapted to generate a suspect document error signal when the retrieved authenticating characteristic information does not favorably compare with the master authenticating characteristic information.

2. The system of claim 1 wherein each of the currency processing devices further comprises a device memory, and wherein the device processor is adapted to record each occurrence of the suspect document error signal in the device memory so as to maintain a device-specific reviewable record of the number of occurrences of suspect document error signals, the memory being adapted to maintain the reviewable record after evaluating the stack of bills.

3. The system of claim 1 comprising a printer adapted to produce a hard copy of the record of suspect document error signals.

4. The system of claim 1 comprising a display adapted to display the record the number of suspect document error signals.

5. The system of claim 1 wherein the record of the number of suspect document error signals includes information selected from the group consisting of indicia of the particular currency handling device generating the suspect document error signal, indicia of an operator of the particular currency handling device generating the suspect document error signal, a time of the occurrence of the suspect document error signal, a running total of the number of suspect document error signals occurring during a designated time interval, and a running total of the number of suspect document error signals occurring during the processing of a plurality of stacks of currency bills.

6. The system of claim 1 wherein the at least one controller comprises:
    a plurality of local controllers, each of the plurality of local controllers being communicatively linked to at least one currency handling device in a designated area; and
    a central controller communicatively linked to each of the plurality of local controllers, the central controller being adapted to process the records of suspect document error signals derived by each of the plurality of local controllers to produce a further record of the number of suspect document error signals.

7. The system of claim 6 wherein the designated area is a bank branch location.

8. The system of claim 7 wherein the central controller is associated with a banking system.

9. The system of claim 7 wherein the central controller corresponds to a geographic region.

10. The system of claim 1 wherein the at least one controller is adapted to receive information associated with no call error signals generated by each of the currency handling devices and to process the received information associated with no call error signals to derive a record of the number of no call error signals, the at least one system memory being adapted to store the record of the number of no call error signals in a manner to permit subsequent recall.

11. The system of claim 10 wherein the evaluation region of each of the currency handling devices is adapted to retrieve denominating characteristic information from each of the bills, and wherein the device processor of each of the currency handling devices is adapted to denominate each of the bills by comparing the retrieved denominating characteristic information from each of the bills to master denominating characteristic information and to generate a no call error signal when the retrieved denominating characteristic information does not favorable compare to the master denominating characteristic information.

12. A banking system comprising a plurality of the currency processing systems of claim 1 communicatively linked to a central controller adapted to process the records of the number suspect document error signals derived by each of the at least one controllers to produce a further record of the number of suspect document error signals.

13. A banking system for processing currency bills comprising:
 a plurality of currency handling devices for evaluating currency bills located in a plurality of bank branch locations;
 a plurality of local controllers, each of the plurality of local controllers associated with a bank branch location, each of the plurality of local controllers linked to at least one currency handling device located in the associated bank branch location, each of the local controllers adapted to communicate with each of the linked currency handling devices and to receive information associated with no call error signals from each of the linked currency handling devices, each of the local controllers being adapted to process the received information associated with no call error signals to derive an aggregate record of the number of no call error signals;
 a local controller memory associated with each of the plurality of local controllers, the local controller memory adapted to store the aggregate record of the number of no call error signals in a manner to permit subsequent recall;
 a central controller communicatively linked to each of the plurality of local controllers, the central controller associated with a central office of a banking operation, the central controller being adapted to process the aggregate records of the number of no call error signals derived by each of the plurality of local controllers to generate a further aggregate record of the number of no call error signals; and
 a central controller memory adapted to store the further aggregate record of the number of no call error signals in a manner to permit subsequent recall;
 wherein each of the currency handling devices comprises
  an input receptacle adapted to receive a stack of currency bills;
  an evaluation region adapted to retrieve denominating characteristic information from each of the bills;
  a transport mechanism adapted to transport the bills from the input receptacle, one at a time, past the evaluation region to at least one output receptacle; and
  a device processor adapted to denominate each of the currency bills by comparing the retrieved denominating characteristic information obtained from each of the bills to master denominating information, the device processor being adapted to generate a no call error signal when the retrieved denominating characteristic information does not favorably compare with the master denominating characteristic information.

14. The system of claim 13 wherein each of the currency processing devices further comprises a device memory adapted to store the master denominating characteristic information, and wherein the device processor is adapted to record each occurrence of the no call error signal in the device memory so as to maintain a device-specific reviewable record of the number of occurrences of no call error signals, the memory being adapted to maintain the reviewable record after evaluatin the stack of bills.

15. The system of claim 13 comprising a printer coupled to each of the local controllers adapted to produce a hard copy of the aggregate record of the number of no call error signals.

16. The system of claim 13 comprising a printer coupled to the central controller adapted to produce a hard copy of the further record of the number of no call error signals.

17. The system of claim 13 comprising a display adapted to display the aggregate record of the number of no call error signals and the further aggregate record of the number of no call error signals.

18. The system of claim 13 wherein the aggregate record of the number of no call error signals includes information selected from the group consisting of indicia of the particular currency handling device generating the no call error signal, indicia of an operator of the particular currency handling device generating the no call error signal, a time of the occurrence of the no call error signal, a running total of the number of no call error signals occurring during a designated time interval, and a running total of the number of no call error signals occurring during the processing of a plurality of stacks of currency bills.

19. The system of claim 13 wherein the further aggregate record of no call error signals includes information selected from the group consisting of indicia of the currency handling device generating the no call error signal, indicia of an operator of the currency handling device generating the no call error signal, a time of the occurrence of the no call error signal, a running total of the number of no call error signals occurring during a designated time interval, a running total of the number of no call error signals occurring during the processing of a plurality of stacks of currency bills, and indicia of the local controller linked to the currency handling device generating the no call error signals.

20. The system of claim 13 wherein each of the plurality of currency handling devices are adapted to authenticate each of the currency bills, and wherein each of the local area controllers are adapted to receive information associated with suspect document error signals and to process the received information associated with suspect document error signals to derive an aggregate record of the number of suspect document error signals.

21. The system of claim 20 wherein the local controller is adapted to combine the aggregate record of the number of suspect document error signals and the aggregate record of the number of no call error signals into a single error signal aggregate record.

22. A method for evaluating currency bills with a plurality of currency handling devices and recording information associated with the evaluation of the currency bills, each of the currency handling devices including a transport mechanism adapted to transport currency bills, one at a time, from an input receptacle past an evaluation region to at least one output receptacle, the evaluation region adapted to retrieve authenticating characteristic information from each of the bills, the currency handling devices including a device memory for storing master authenticating information and a device processor, the method comprising:

retrieving authenticating characteristic information from each of the bills with one of the plurality of currency handling devices;

comparing the retrieved authenticating characteristic information to stored master authenticating information;

generating a suspect document error signal when the retrieved authenticating characteristic information does not favorably compare to stored master authenticating information;

communicating information associated with the occurrence of each suspect document error signal to at least one system controller linked to the plurality of currency handling devices;

generating a record of the number of suspect document error signals from the communicated information associated with the occurrence of each suspect document error signal; and recording the record of the number of suspect document error signals in a system memory in a manner to permit subsequent recall and review.

23. The method of claim 22 further comprising displaying the record of the number of suspect document error signals.

24. The method of claim 22 further comprising printing the record of the number of suspect document error signals.

25. The method of claim 22 wherein recording information further comprises recording information selected from the group consisting of indicia of the particular currency handling device generating the suspect document error signal, indicia an operator of the particular currency handling device generating the suspect document error signal, a time of the occurrence of the suspect document error signal, a running total of the number of suspect document error signals occurring during a designated time interval, and a running total of the number of suspect document error signals occurring during the processing of a plurality of stacks of currency bills.

26. The method of claim 22 wherein the at least one system controller comprises a central controller and a plurality of local controllers, each of the local controllers being communicatively linked to the central controller, the method further comprising:

transmitting the records of the number of suspect document error signals to the central controller;

generating a further record of the number of suspect document error signals from the transmitted records of the number of suspect document error signals; and recording the further record of the number of suspect document error signals in a central system memory in a manner to permit subsequent recall and review.

27. The method of claim 26 wherein each of the local controllers is associated with a bank branch location.

28. The method of claim 26 wherein the central controller is associated with a banking system.

29. The method of claim 22 wherein the evaluation region of each of the currency handling devices is adapted to retrieve denominating characteristic information from each of the bills and the device memory is adapted to store master denominating characteristic information, the method further comprising:

retrieving denominating characteristic information from each of the bills with one of the plurality of currency handling devices;

comparing the retrieved denominating characteristic information to stored master denominating characteristic information;

generating a no call error signal when the retrieved denominating characteristic information does not favorably compare to stored master denominating characteristic information;

communicating information associated with the occurrence of no call error signals to the at least one system controller linked to the plurality of currency handling devices; and generating a record of the number of no call error signals from the communicated information associated with the occurrence of each no call error signal.

30. The method of claim 29 wherein generating further comprises generating a combined record of the number of no call error signals and the number of suspect document error signals.

31. The method of claim 22 further comprising recording each occurrence of a suspect document error signal in the device memory so as to provide a device-specific reviewable record of the number of suspect document error signals generated by the currency handling device.

32. A method for evaluating currency bills with a plurality of currency handling devices and recording information associated with the evaluation of the currency bills, each of the currency handling devices including a transport mechanism adapted to transport currency bills, one at a time, from an input receptacle past an evaluation region to at least one output receptacle, the evaluation region adapted to retrieve authenticating characteristic information from each of the bills, the currency handling devices including a device memory for storing master denominating information and a device processor, the method comprising:

retrieving denominating characteristic information from each of the bills with one of the plurality of currency handling devices;

comparing the retrieved denominating characteristic information to stored master denominating information;

generating a no call document error signal when the retrieved denominating characteristic information does not favorably compare to stored master denominating information;

communicating information associated with the occurrence of each no call error signal to at least one system controller linked to the plurality of currency handling devices;

generating a record of the number of no call error signals from the communicated information associated with the occurrence of each no call error signal; and recording the record of the number of no call error signals in a system memory in a manner to permit subsequent recall and review.

33. The method of claim 32 further comprising displaying the record of the number of no call error signals.

34. The method of claim 32 further comprising printing the record of the number of no call document error signals.

35. The method of claim 32 wherein recording information further comprises recording information selected from the group consisting of indicia of the particular currency handling device generating the no call error signal, indicia of an operator of the particular currency handling device generating the no call error signal, a time of the occurrence of the no call document error signal, a running total of the number of no call error signals occurring during a designated time interval, and a running total of the number of no call error signals occurring during the processing of a plurality of stacks of currency bills.

36. The method of claim 32 wherein the at least one system controller comprises a central controller and a plurality of local controllers, each of the local controllers being communicatively linked to the central controller, the method further comprising:
   transmitting the records of the number of no call error signals to the central controller;
   generating a further record of the number of no call error signals from the transmitted records of the number of no call error signals; and
   recording the further record of the number of no call error signals in a central system memory in a manner to permit subsequent recall and review.

37. The method of claim 36 wherein each of the local controllers is associated with a bank branch location.

38. The method of claim 26 wherein the central controller is associated with a banking system.

39. The method of claim 22 wherein the evaluation region of each of the currency handling devices is adapted to retrieve authenticating characteristic information from each of the bills and the device memory is adapted to store master authenticating characteristic information, the method further comprising:
   retrieving authenticating characteristic information from each of the bills with one of the plurality of currency handling devices;
   comparing the retrieved authenticating characteristic information to stored master authenticating characteristic information;
   generating a suspect document error signal when the retrieved authenticating characteristic information does not favorably compare to stored master authenticating characteristic information;
   communicating information associated with the occurrence of suspect document error signals to the at least one system controller linked to the plurality of currency handling devices; and
   generating a record of the number of suspect document error signals from the communicated information associated with the occurrence of each suspect document error signal.

40. The method of claim 29 wherein generating further comprises generating an combined record of the number of no call error signals and the number of suspect document error signals.

41. The method of claim 22 further comprising recording each occurrence of a no call error signal in the device memory so as to provide a device-specific reviewable record of the number of no call document error signals generated by the currency handling device.

42. A banking system for processing currency bills and communicating information concerning the processed bills between a central office of a banking operation and a plurality of bank branch locations, the system comprising:
   a plurality of currency handling devices for evaluating currency bills located in a plurality of bank branch locations, each of the currency handling devices adapted to denominate currency bill and to generate a no call error signal when the denomination of a bill can not be determined, each of the currency handing devices adapted to authenticate currency bills and to generate a suspect document error signal when a bill is not authenticated;
   a plurality of local controllers, each of the plurality of local controllers associated with a bank branch location, each of the plurality of local controllers linked to at least one currency handling device located in the associated bank branch location, each of the local controllers adapted to communicate with each of the linked currency handling devices and to receive information associated with no call error signals and suspect document error signals from each of the linked currency handling devices, each of the local controllers being adapted to process the received information associated with no call error signals and suspect document error signals to derive an aggregate record of the number of no call error signals and suspect document error signals;
   a local controller memory associated with each of the plurality of local controllers, the local controller memory adapted to store the aggregate record of the number of no call error signals and suspect document error signals in a manner to permit subsequent recall;
   a central controller communicatively linked to each of the plurality of local controllers, the central controller associated with a central office of a banking operation, the central controller being adapted to process the aggregate records of the number of no call error signals and the number of suspect document error signals derived by each of the plurality of local controllers to generate a further aggregate record of the number of no call error signals and suspect document error signals; and
   a central controller memory adapted to store the further aggregate record of the number of no call error signals and suspect document error signals in a manner to permit subsequent recall.

43. The banking system of claim 42 wherein each of the currency handling devices comprises:
   an input receptacle adapted to receive a stack of currency bills;
   an evaluation region adapted to retrieve denominating characteristic information from each of the bills, the evaluation region being adapted to retrieve authenticating characteristic information from each of the bill;
   a transport mechanism adapted to transport the bills from the input receptacle, one at a time, past the evaluation region to at least one output receptacle;
   a device processor adapted to denominate each of the currency bills by comparing the retrieved denominating characteristic information obtained from each of the bills to master denominating information, the device processor being adapted to generate a no call error signal when the retrieved denominating characteristic information does not favorably compare with the master denominating characteristic information, the device processor being adapted to authenticate each of the currency bills by comparing the retrieved authenticating characteristic information obtained from each of the bills to master authenticating information, the device processor being adapted to generate a suspect document error signal when the retrieved authenticating characteristic information does not favorably compare with the master authenticating characteristic information; and a device memory adapted to store the master denominating characteristic information and the master authenticating characteristic information, and wherein the device processor is adapted to record each occurrence of the no call error signal and each occurrence of the suspect document error signal in the device memory so as to maintain a device-specific reviewable record of the number of occurrences of no call error signals and suspect document error signals, the memory being adapted to maintain the reviewable record after evaluating the stack of bills.

44. The system of claim 42 comprising a printer coupled to each of the local controllers adapted to produce a hard copy of the aggregate record of the number of no call error signals.

45. The system of claim 42 comprising a printer coupled to the central controller adapted to produce a hard copy of the further record of the number of no call error signals.

46. The system of claim 42 comprising a display adapted to display the aggregate record of the number of no call error signals and the further aggregate record of the number of no call error signals.

47. The system of claim 42 wherein the aggregate record of the number of no call error signals and suspect document error signals includes information selected from the group consisting of indicia of the particular currency handling device generating the error signal, indicia of an operator of the particular currency handling device generating the error signal, a time of the occurrence of the error signal, a running total of the number of error signals occurring during a designated time interval, and a running total of the number of error signals occurring during the processing of a plurality of stacks of currency bills.

48. The system of claim 42 wherein the further aggregate record of no call error signals and suspect document error signals includes information selected from the group consisting of indicia of the currency handling device generating the error signal, indicia of an operator of the currency handling device generating the error signal, a time of the occurrence of the error signal, a running total of the number of error signals occurring during a designated time interval, a running total of the number of error signals occurring during the processing of a plurality of stacks of currency bills, and indicia of the local controller linked to the currency handling device generating the error signals.

* * * * *